United States Patent [19]

Ito

[11] Patent Number: 4,495,576
[45] Date of Patent: Jan. 22, 1985

[54] DEVICE AND METHOD FOR ACCURATELY CONTROLLING AUTOMATIC TRANSMISSION WITH LOCKUP CLUTCH

[75] Inventor: Hiroshi Ito, Toyota, Japan

[73] Assignee: Toyota Jidosha Kabushiki Kaisha, Sichi, Japan

[21] Appl. No.: 365,306

[22] Filed: Apr. 5, 1982

[30] Foreign Application Priority Data

Jul. 21, 1981 [JP] Japan .................................. 56-114062

[51] Int. Cl.³ ...................... B60K 41/08; B60K 41/22; G06F 15/20
[52] U.S. Cl. .............................. 364/424.1; 74/752 D; 74/866; 74/867; 192/0.09; 192/3.28
[58] Field of Search ............... 364/424.1; 74/866, 867, 74/868; 192/0.09, 3.28

[56] References Cited

U.S. PATENT DOCUMENTS

| | | | |
|---|---|---|---|
| 4,155,277 | 5/1979 | Minami et al. | 74/866 |
| 4,373,619 | 2/1983 | Schritt et al. | 74/866 X |
| 4,393,467 | 7/1983 | Miki et al. | 364/424.1 |
| 4,411,174 | 10/1983 | Yokoi et al. | 74/866 |
| 4,414,863 | 11/1983 | Heino | 74/866 |
| 4,417,303 | 11/1983 | Kubo et al. | 364/424.1 |

*Primary Examiner*—Felix D. Gruber

*Attorney, Agent, or Firm*—Stevens, Davis, Miller & Mosher

[57] ABSTRACT

A vehicle transmission includes a gear transmission mechanism and a torque converter with a lock up clutch, both hydraulically activated. The transmission control device practices the method, and includes an electronic computer which inputs data representing operational parameters of the vehicle and outputs transmission speed stage command signals and lock up clutch command signals, and a hydraulic control system controlled by the computer which according to these signals controls the lock up clutch to be engaged or disengaged and the transmission to be set to its various speed stages. Sometimes the lock up clutch is engaged just before the computer changes the speed stage of the transmission, and in this case the lock up clutch is disengaged by the computer during a time period overlapping the time period taken for the change of speed stage, with the time instant of commencement of dispatch of lock up clutch disengage signals from the computer to initiate the disengagement of the lock up clutch being displaced in time from the time instant of dispatch of speed stage change signals from the computer to initiate the change of speed stage. Particularly, the time displacement may be forward in the case of an upshift, and backward in the case of a downshift.

8 Claims, 14 Drawing Figures

| MANUAL SHIFT RANGE | SPEED STAGE | SOLENOID | | | FRICTION ENGAGING MECHANISM | | | | | | | ONE WAY CLUTCH | | |
|---|---|---|---|---|---|---|---|---|---|---|---|---|---|---|
| | | NO.1 | NO.2 | NO.3 | $C_0$ | $B_0$ | $C_1$ | $C_2$ | $B_1$ | $B_2$ | $B_3$ | $F_0$ | $F_1$ | $F_2$ |
| D | 1st | E | n | (E) | E | | E | | | | | E | | E |
| | 2nd | E | E | (E) | E | | E | | | E | | E | E | |
| | 3rd | n | E | (E) | E | | E | E | | E | | E | | |
| | O/D | n | n | (E) | | E | E | E | | E | | | | |
| 3 | 1st | E | n | (E) | E | | E | | | | | E | | E |
| | 2nd | E | E | (E) | E | | E | | E | E | | E | E | |
| | 3rd | n | E | (E) | E | | E | E | | | | E | | |
| L | 1st | E | n | n | E | | E | | | E | | E | | E |
| R | Rev | n | n | n | E | | | E | | | E | E | | |
| P, N | | n | n | n | E | | | | | | | E | | |

| MANUAL SHIFT RANGE | SPEED STAGE | SOLENOID | | | FRICTION ENGAGING MECHANISM | | | | | | | ONE WAY CLUTCH | | |
|---|---|---|---|---|---|---|---|---|---|---|---|---|---|---|
| | | NO.1 | NO.2 | NO.3 | $C_0$ | $B_0$ | $C_1$ | $C_2$ | $B_1$ | $B_2$ | $B_3$ | $F_0$ | $F_1$ | $F_2$ |
| D | 1st | E | n | (E) | E | | E | | | | | E | | E |
| | 2nd | E | E | (E) | E | | E | | | E | | E | E | |
| | 3rd | n | E | (E) | E | | E | E | | E | | E | | |
| | O/D | n | n | (E) | | E | E | E | | E | | | | |
| 3 | 1st | E | n | (E) | E | | E | | | | | E | | E |
| | 2nd | E | E | (E) | E | | E | | E | E | | E | E | |
| | 3rd | n | E | (E) | E | | E | E | | | | E | | |
| L | 1st | E | n | n | E | | E | | | | E | E | | E |
| R | Rev | n | n | n | E | | | E | | | E | E | | |
| P, N | | n | n | n | E | | | | | | | E | | |

FIG. 7
FIG. 8
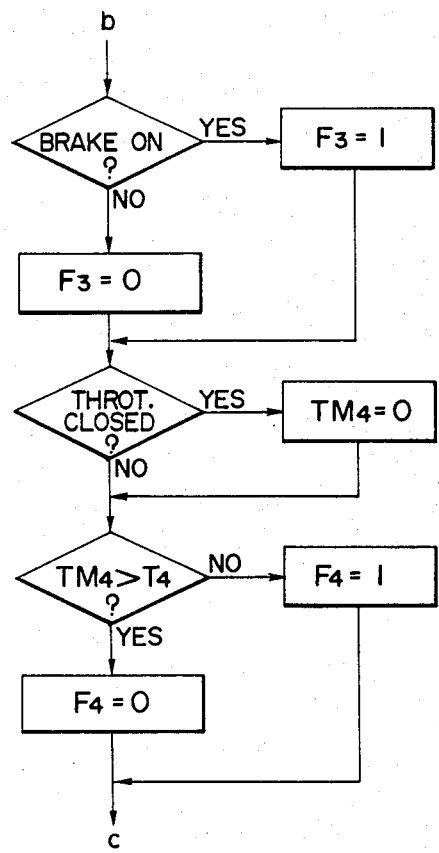
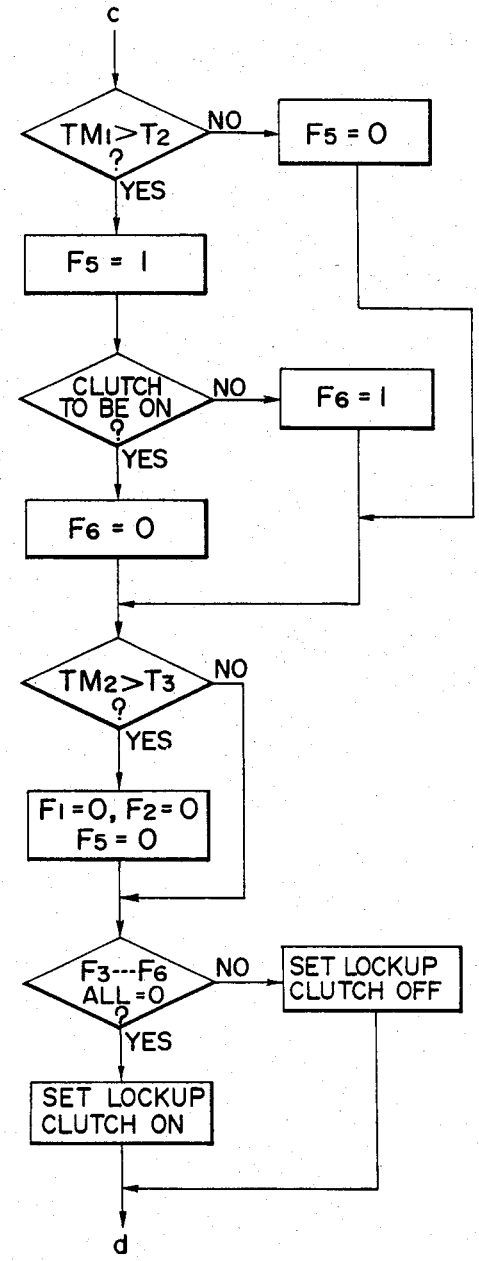

FIG. 9a
UPSHIFT WITH CLUTCH ON BEFORE AND AFTER
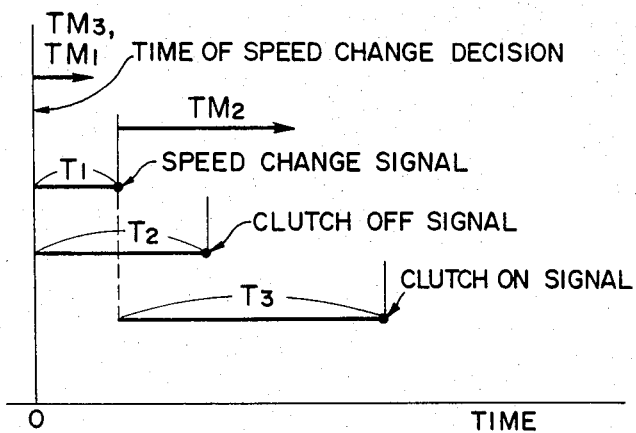
FIG. 9b
DOWNSHIFT WITH CLUTCH ON BEFORE AND AFTER
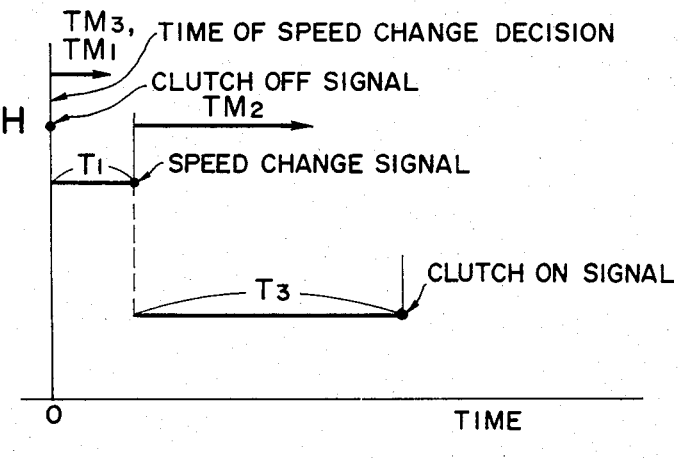
FIG. 10
| | SPEED STAGE CHANGE | UPSHIFT | | | DOWNSHIFT | | |
|---|---|---|---|---|---|---|---|
| | | $T_1$ | $T_2$ | $T_3$ | $T_1$ | $T_2$ | $T_3$ |
| LOCKUP CLUTCH ON BEFORE CHANGE | 1st→2nd | — | — | $t_3$ | $t_4$ | 0 | — |
| | 2nd→3rd | $t_{11}$ | $t_{12}$ | $t_{13}$ | $t_{14}$ | 0 | $t_{16}$ |
| | 3rd→O/D | $t_{21}$ | $t_{22}$ | $t_{23}$ | $t_{24}$ | 0 | $t_{26}$ |
| LOCKUP CLUTCH OFF BEFORE CHANGE | 1st→2nd | 0 | 0 | $t_3$ | 0 | 0 | — |
| | 2nd→3rd | 0 | 0 | $t_{13}$ | 0 | 0 | $t_{16}$ |
| | 3rd→O/D | 0 | 0 | $t_{23}$ | 0 | 0 | $t_{26}$ |

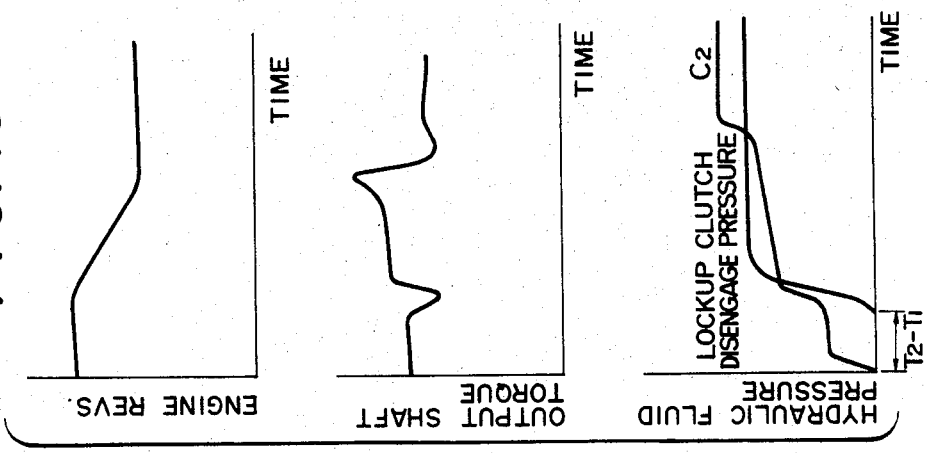
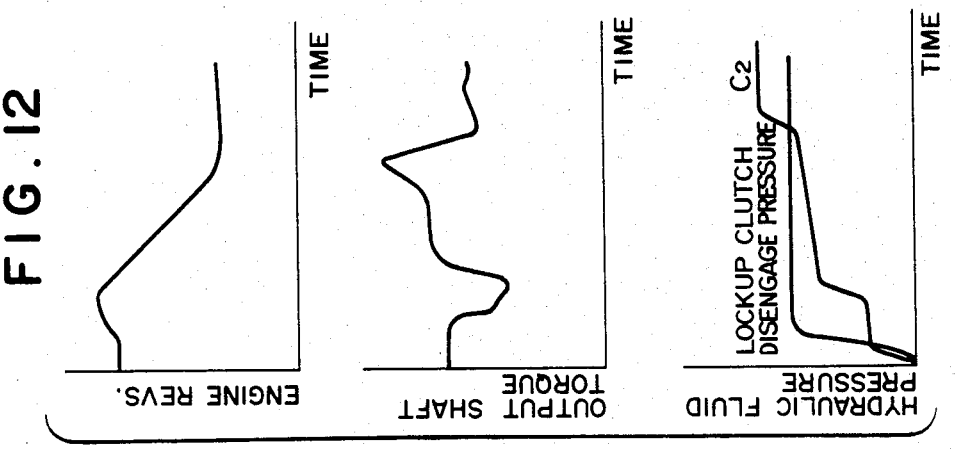
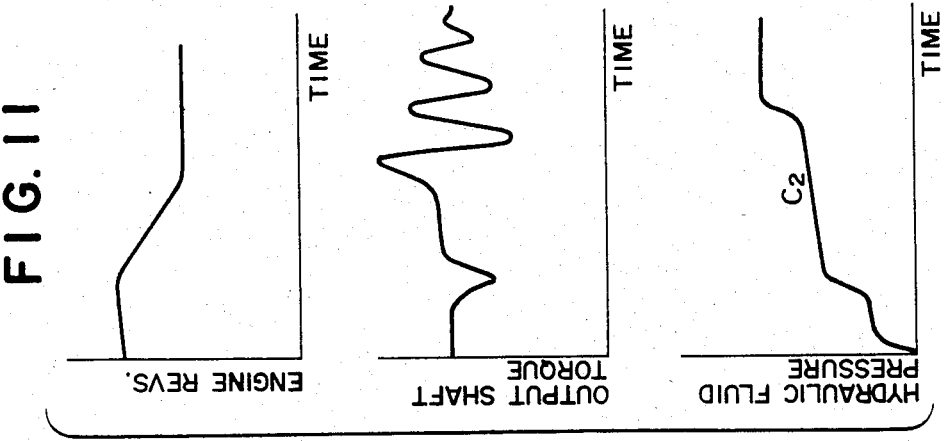

DEVICE AND METHOD FOR ACCURATELY CONTROLLING AUTOMATIC TRANSMISSION WITH LOCKUP CLUTCH

BACKGROUND OF THE INVENTION

The present invention relates to an accurate control device for a transmission for an automotive vehicle and to a method practiced by said device, and, more particularly, relates to a control device, incorporating an electrically actuated hydraulic fluid pressure control system and an electronic control computer which controls said electrically actuated hydraulic fluid pressure control system, said control device accurately controlling selective supply of hydraulic fluid pressures to a hydraulically controlled transmission so as to accurately set it to any one of its various speed stages, and to a control method for said hydraulically controlled transmission practiced by said device.

Automatic transmissions for automotive vehicles which include gear transmission mechanisms including several fluid pressure activated friction engaging mechanisms such as multi plate clutches and multi plate brakes are well known in various forms. Such an automatic transmission is usually conventionally controlled by a hydraulic fluid pressure control system, which selectively controls supply of hydraulic fluid pressure to the friction engaging mechanisms, according to decisions that said hydraulic fluid pressure control system makes as to what speed stage of the gear transmission mechanism should be currently engaged, in view of and based upon the current values of various operational parameters of the vehicle, such as the road speed of the vehicle, the load upon an internal combustion engine of the vehicle, and the like.

In more detail, it is well known and conventional for such a hydraulic fluid pressure control system to receive supply of a throttle hydraulic fluid pressure which is produced as the output of a throttle hydraulic fluid pressure control valve, and which varies according to the amount of depression of an accelerator pedal of the vehicle incorporating the transmission, which is taken as indicative of the load on the internal combustion engine of the vehicle, and also to receive supply of a governor hydraulic fluid pressure which is produced as the output of a governor hydraulic fluid pressure control valve, and which is varied according to the road speed of the vehicle. Such a conventional hydraulic fluid pressure control system, in order to decide upon a speed stage of the gear transmission mechanism which is to be engaged, evaluates various relations between the magnitudes of the throttle hydraulic fluid pressure and the governor hydraulic fluid pressure, by supplying these pressures to various shift valves so as to act upon the valve elements thereof in opposition, according to various equilibrium relationships, and, based upon the movement of these valve elements, supplies of activating fluid pressure to the various friction engaging mechanisms such as the aforementioned clutches and brakes are made, in order to engage the appropriate speed stage which has thus been decided upon.

Nowadays, however, with the rapid progress which is being attained in the field of electronic control systems, various arrangements have been proposed, in which electronic control circuits make control decisions as to what speed stage of the gear transmission mechanism should be currently engaged, in view of and based upon the current values of various operational parameters of the vehicle, such as the road speed of the vehicle, the load upon an internal combustion engine of the vehicle, and the like. The current values of these operational parameters are sensed by sensors which dispatch signals to the electronic control system via A/D converters and the like. In such arrangements, electric signals are sent by such an electronic control system to electric to hydraulic pressure conversion devices such as solenoid valves, and these electric to hydraulic pressure conversion devices perform the actual switching of the aforesaid activating hydraulic fluid pressures to the friction engaging mechanisms.

Many conventional such electronic control systems for providing actuating hydraulic fluid pressures for engaging the friction engaging mechanisms of gear transmission mechanisms with four forward speed stages are essentially similar, in their basic control logic, to the above described conventional hydraulic fluid pressure transmission control systems, in having a first and second speed switching valve, which controls the switching between the first speed stage and the second speed stage, a second and third speed switching valve, which controls the switching between the second speed stage and the third speed stage, and a third and fourth speed switching valve, which controls the switching between the third speed stage and the fourth speed stage. In other words, the only difference is that the switching controls of these transmission switching valves are performed by electrically actuated means, such as solenoid valve devices or the like, based upon control judgements made by an electronic circuit, instead of according to the above described type of set of equilibrium relations between throttle hydraulic fluid pressure and governor hydraulic fluid pressure, etc., as in conventional hydraulic fluid pressure transmission control systems. Thus, according to this basic structure, in the case of a gear transmission mechanism which has four forward speed stages, as outlined above three transmission switching valves are required, and also three solenoid valves are required for controlling these three transmission switching valves.

As opposed to the above outlined basic structure for an electric transmission control system, it has been previously remarked upon that, since it is possible to achieve switching between two alternatives by using one switched valve, i.e. by using one combination of a transmission valve and an electric actuator such as a solenoid, then, by using a combination of two such switched valves, it should be possible to switch between four different combinations, according to the four possible combinations of switching available from two binary switching devices. This is based upon the fundamental concept that $2 \times 2 = 4$. In this case, certainly the structure becomes simplified, because the number of shift valves is reduced to the absolute minimum of two. Such a form of transmission control system, for example, is disclosed in Japanese Patent Publication No. 5128/73. A more developed form of such transmission control system is disclosed in Japanese Patent Application No. 69110/80 which was filed previously to the filing of the parent Japanese patent application No. 114062/81 of the present application of which priority is being claimed in the present application, and for which prior art concept also it is known to the present inventor that U.S. patent application Ser. No. 06/263,261 has been filed previous to the filing of the present application claiming the priority of said previous Japanese application, said previously applied Japanese and U.S. patent applications relating to said prior art concept being invented by different inventors than the present application; and the present inventor hereby desires to acknowledge his debt to this previous proposal, and to incorporate the subject matter of that previous U.S. patent application by reference into the present application, by way of background prior art.

Further, an automatic transmission conventionally includes a fluid torque converter, which provides a fluid coupling between the engine of the vehicle and the gear transmission mechanism, thus eliminating the need for any clutch system for the drive train of the vehicle, allowing smooth shifting of the transmission between its various speed stages while said transmission is transmitting rotational power while the vehicle is moving, and also allowing for the vehicle to be stationary while the engine is turning at a low rotational speed at or close to the idling speed without the engine stalling, as well as providing torque multiplication by fluid flow in a per se well known way when the vehicle is being accelerated at relatively low speed and relatively low engine rotational speed. Many such torque converters are of course presently well known. Generally, such a torque converter comprises: a housing of a generally toroidal shape, on the inside of which there are formed a series of vanes which constitute a pump impeller, and fixed to a power input shaft; a turbine member mounted within the housing as fixed to a power output shaft; and a stator member mounted within the housing via a one way brake on a fixed member. The housing of such a torque converter is kept filled with hydraulic fluid, which is pumped thereinto and is also drained therefrom, and in a per se well known way the pump impeller, the stator member, and the turbine member cooperate, when the housing of the torque converter is thus filled with hydraullic fluid, to define a toroidal hydraulic fluid flow circulation system, circulation of hydraulic fluid around which in the general circulation fashion of a ring is arranged to transfer torque in a conventional manner between the pump impeller and the turbine member of the torque converter.

This supply of hydraulic fluid for filling the torque converter is typically provided to the inside of the housing thereof via a first channel defined along or beside the central rotational axis thereof—in more detail, via a hole in one of the shafts passing along said central rotational axis or through a space defined between two concentric ones of such shafts; and the draining of hydraulic fluid from the torque converter is also typically performed in a similar manner, through a second such channel. The supply of hydraulic fluid is provided, generally in the prior art, from a torque converter hydraulic fluid pressure regulation valve which supplies a supply of hydraulic fluid at a regulated torque converter hydraulic fluid pressure, which is generally rather lower than the line hydraulic fluid pressure, to the torque converter.

Further, it has become more and more common nowadays for a torque converter to be provided with a lock up clutch, i.e. a mechanical clutch which, when actuated, mechanically couples together the pump impeller and the turbine member of the torque converter with regard to their rotation, so that the above mentioned hydraulic torque transmission between the pump impeller and the turbine member no longer occurs or is relevant.

It is well known and conventional for such a lock up clutch to be engaged or disengaged according to the directions of supply and draining of the torque converter hydraulic fluid pressure to and from the interior of the housing of the torque converter. In other words, when the torque converter hydraulic fluid pressure mentioned above is being supplied to one channel which leads to the interior of the torque converter housing, and is being released from another channel, then it is arranged that the lock up clutch is engaged; and when the torque converter hydraulic fluid pressure is being supplied to said other channel, and is being drained from said one channel, then it is arranged that the lock up clutch is disengaged. Thus the supply of torque converter hydraulic fluid pressure to the torque converter from the torque converter pressure regulation valve is used for two purposes: to fill the torque converter with hydraulic fluid; and to selectively engage and disengage the lock up clutch, according to the direction of said supply.

The selective engagement of this lock up clutch, in the prior art of hydraulic fluid pressure control systems for transmissions, is typically performed by a control device such as a hydraulic fluid pressure control device incorporated in the hydraulic fluid pressure control system which controls the engagement of the various gear speed stages of the gear transmission mechanism, according to the operational conditions of the vehicle to which the torque converter incorporating this lock up clutch is fitted. In more detail, generally such a lock up clutch is desirably engaged when the torque converter is required to transmit rotary power at a fairly high rotational speed, at which time the torque conversion function of the torque converter is not required. In such a case, if the lock up clutch is not engaged, then, although the torque converter at this time provides a substantially direct power transmission function between its pump impeller and its turbine member, nevertheless a small amount, such as a few percent, of slippage between the pump impeller and the turbine member will inevitably occur, and this will waste a substantial amount of energy because of the useless churning of hydraulic fluid within the torque converter, and also will cause undesirable heating up of the hydraulic fluid contained within the torque converter. On the other hand, such a lock up clutch is desirable, of course, disengaged when the road speed of the automobile is low, or when the rotational speed of the internal combustion engine thereof, i.e. the rotational speed of the pump impeller of the torque converter, is so low as to be close to idling rotational speed, in order to utilize the buffering action of the torque converter at these times, as well as the torque multiplication function thereof. Thus, such a lock up clutch has been engaged by the above mentioned prior art type of hydraulic fluid pressure control device, typically, when and only when the vehicle incorporating the torque converter is being driven at high road speed with the gear transmission mechanism in its highest gear speed stage, with the internal combustion engine of the vehicle thus operating at fairly high rotational speed, in which circumstances the actual hydraulic torque conversion function of the torque converter is not in fact particularly required. The provision of such a lock up clutch is effective for increasing fuel economy of the vehicle, especially when running on the open road such as on an expressway.

A well known prior art construction for such a hydraulic fluid pressure control device for controlling a lock up clutch has comprised a lock up clutch control valve, which is switched between two positions, and which, when in its first switched position, switches said torque converter hydraulic fluid pressure mentioned above so as to supply it to said one channel which leads to the interior of the torque converter housing, and drains said other channel, so as to engage said lock up clutch, and which, when in its second switched position, switches said torque converter hydraulic fluid pressure mentioned above so as to supply it to said other channel, and drains said one channel, so as to disengage said lock up clutch, said lock up clutch control valve being switched to said first switched position thereof by supply of a control hydraulic fluid pressure, and, when said control hydraulic fluid pressure is not supplied, being switched to said second switched position thereof by some biasing force. Thus, when said control hydraulic fluid pressure is provided to said lock up clutch control valve, then said lock up clutch control valve is switched to its said first switched position, and accordingly the lock up clutch is engaged; and, when said control hydraulic fluid pressure is not provided to said lock up clutch control valve, then said lock up clutch control valve is switched to its said second switched position by the biasing force, and accordingly the lock up clutch is disengaged. In such an above mentioned prior art type of hydraulic fluid pressure control device, this control hydraulic fluid pressure has been provided from a hydraulic fluid pressure control system, which decides when the lock up clutch should be engaged, and which is incorporated in the automatic transmission hydraulic fluid pressure control system as a whole.

Nowadays, with the increased emphasis which is being put upon fuel economy of automotive vehicles due to rising fuel costs and greater public attention being paid to economic and pollution problems, the advantages secured by the engagement of such a lock up clutch are more and more important. In this connection, it would be beneficial for the lock up clutch to be engaged during the engagement of other speed stages of the transmission than the highest speed stage only as has heretofore been practiced, and to be engaged for a greater proportion of the time during the engagement of said highest speed stage, i.e. over a greater range of operational conditions of the vehicle. However, such increase of the utilization of the lock up clutch runs into the problem that it is very important for the lock up clutch to be disengaged at the time of shifting of the transmission between its various speed stages. This is because the shifting of the gear transmission mechanism of the automatic transmission between its speed stages, for example between its highest speed stage and its next to highest speed stage, will cause a severe transmission shock, if the lock up clutch is engaged at the time of shifting, whether the direction of the shift is upwards or downwards. In other words, the torque shock cushioning effect of the torque converter is very important when the gear transmission mechanism of the automatic transmission changes its speed stage. If the transmission changes speed stage with the lock up clutch still engaged, this can cause various undesirable effects, such as shortening the operational life of the friction engaging mechanisms of said transmission as well as the various gears and other parts thereof, and perhaps causing premature failure of the automatic transmission as a whole, as well as damaging the drivability of the vehicle and perhaps even causing a dangerous accident.

To a certain extent this problem has even occurred in the prior art when the operational range of engagement of the lock up clutch has been set in such a high speed range, i.e. above such a high predetermined road speed value, that the transmission should always be definitely set to its highest speed stage during lock up clutch engagement, because in exceptional circumstances the gear transmission mechanism of the automatic transmission may be forced to shift from its highest speed stage to a lower speed stage, even at a vehicle road speed higher than the predetermined road speed value; for example, when the driver of the vehicle forces such a shift, by moving the manual transmission shift lever of the vehicle from the "D" range to the "3" range. In such a case, if the lock up clutch is kept engaged, a severe transmission shock is liable to occur.

A possible solution for these problems that might be conceived of could be for the above mentioned hydraulic fluid pressure control system which decides when the lock up clutch should be engaged to disengage the lock up clutch during changing of transmission speed stage. However, it has been determined by the present inventor during researches relative to the present invention, as will be explained in more detail later, that the timing of the engagement and the disengagement of the lock up clutch during change of the transmission speed stage, if the lock up clutch is to be engaged both in the earlier speed stage and in the later speed stage to which the transmission is to be shifted from said earlier speed stage, is very delicate and critical, whether in fact the shift of speed stage is an upshift or a downshift. If the timing is not exactly right for the engagement and disengagement of the lock up clutch during change of the transmission speed stage, then danger exists either of the occurrence of unacceptably great variations in the output shaft torque of the automatic transmission, which are liable to be attended with the ill effects detailed above, or of the occurrence of unacceptably great variations in the engine rotational speed, i.e. of engine racing, which can cause premature excessive wear to, or even catastrophic failure of, the vehicle engine. In fact, the delicacy of timing required for such control of the lock up clutch during change of the transmission speed stage cannot practically be obtained with the above mentioned hydraulic form of lock up clutch control, because: firstly, slight manufacturing variations between various hydraulic transmission control systems, due to manufacturing tolerances, cause unacceptably great variations in timing, due to the nature of hydraulic fluid pressure control circuits; secondly, alterations in the viscosity of the hydraulic fluid in the automatic transmission, due to changes in its temperature or to its aging or to dirt particles suspended in said hydraulic fluid or the like, again cause unacceptably great variations in timing; and, thirdly, determining the variations required in the timings of engagement and disengagement of the lock up clutch, in view of the various possible combinations of upshifting and downshifting between the various speed stages of the transmission which will occur, and in view of the current values of vehicle operating parameters such as vehicle speed, engine load, and so on that must be taken account of, is quite beyond the computational capacity of a hydraulic fluid pressure control system, which is only an analog computational capacity and must be achieved with relatively few valves, passages, accumulators, and the like.

Other problems that have occurred with regard to the operation and control of such a lock up clutch relate to the operation of the braking system of the vehicle and to the operation of the engine throttle of the vehicle. In more detail, when the braking system of the vehicle is applied, if the lock up clutch remains engaged at this time there is a risk of the engine stalling; and, further, when the throttle of the vehicle is suddenly opened from the closed condition, then if the lock up clutch is engaged at this time there is a risk of a substantial torque shock being transmitted through the drive train of the vehicle.

SUMMARY OF THE INVENTION

Therefore, the present inventor has conceived the idea of controlling both the transmission and the lock up clutch by the same electronic control system. Because the control which can be exerted by an electronic control system is much more delicate and more easily varied according to operational conditions than is the control which can be exerted by a hydraulic control system, due to the greater speed, flexibility, and complexity that can be attained with digital computing as opposed to analog computing, accordingly the possibility becomes practicable of engaging the lock up clutch during the operation of the transmission in other speed stages than in its highest speed stage, and of momentarily releasing the lock up clutch during shifts between speed stages. In the case of an electronic control system, the necessary accuracy and flexibility for the timing of the disengagement and reengagement of the lock up clutch are available, in contrast to the case when a hydraulic fluid pressure control system is used, which cannot properly control the lock up clutch during such shifting between speed stages.

Further, as will be explained in more detail later in the part of this specification entitled "DESCRIPTION OF THE PREFERRED EMBODIMENT", the present inventor has determined by experimental researches based upon theoretical considerations that in the case of an upshift from one speed stage to a higher speed stage, such as the next higher speed stage, when the lock up clutch is engaged before the change over of speed stages, the time point of commencement of disengagement of the lock up clutch should be delayed by a certain time interval from the time point of commencement of change over of speed stages. This is in order to minimize transmission torque shock transmitted along the power train of the vehicle, and is caused by the different characteristic times which the various parts of the transmission and the lock up clutch take to respond to supply of control hydraulic fluid pressures, as well as other considerations. Further, the aforesaid certain time interval between the time point of commencement of disengagement of the lock up clutch and the time point of commencement of change over of speed stage should be varied, according to what speed stages are being shifted between, and according to other operational characteristics of the vehicle, such as the engine speed, the engine load, etc.

Yet further, as will also be explained in more detail later, the present inventor has also determined by experimental researches based upon theoretical considerations that in the case of a downshift from one speed stage to a lower speed stage, such as the next lower speed stage, when the lock up clutch is engaged before the change over of speed stages, the time point of commencement of disengagement of the lock up clutch should be advanced by a certain time interval before the time point of commencement of change over of speed stages. This, again, is in order to minimize transmission torque shock transmitted along the power train of the vehicle. Further, the aforesaid certain time interval between the time point of commencement of disengagement of the lock up clutch and the time point of commencement of change over of speed stage should be varied, according to what speed stages are being shifted between, and according to other operational characteristics of the vehicle, such as the engine speed, the engine load, etc.

Accordingly, it is the primary object of the present invention to provide a control system for a hydraulically controlled transmission including a fluid torque converter with a lock up clutch, which can avoid the above described problems.

It is a further object of the present invention to provide a control system for a hydraulically controlled transmission including a fluid torque converter with a lock up clutch, in the operation of which engagement of the lock up clutch is performed satisfactorily over a wide range of vehicle operational conditions.

It is a further object of the present invention to provide a control system for a hydraulically controlled transmission including a fluid torque converter with a lock up clutch, which engages the lock up clutch when the transmission is set to other speed stages as well as to its highest speed stage.

It is a further object of the present invention to provide a control system for a hydraulically controlled transmission including a fluid torque converter with a lock up clutch, which positively ensures that the lock up clutch is disengaged, when the transmission is shifting between speed stages.

It is a further object of the present invention to provide a control system for a hydraulically controlled transmission including a fluid torque converter with a lock up clutch, in the operation of which transmission shock, due to the transmission changing between its speed stages while the lock up clutch is engaged, is positively prevented.

It is a further object of the present invention to provide a control system for a hydraulically controlled transmission including a fluid torque converter with a lock up clutch, in the operation of which the timing of disengagement and engagement of the lock up clutch, during the process of the transmission changing between its speed stages, is accurately performed.

It is a further object of the present invention to provide a control system for a hydraulically controlled transmission including a fluid torque converter with a lock up clutch, in the operation of which the timing of disengagement and engagement of the lock up clutch, during the process of the transmission changing between its speed stages, is properly varied according to the particular speed stages which are being shifted between, and the direction of said shifting.

It is a further object of the present invention to provide a control system for a hydraulically controlled transmission including a fluid torque converter with a lock up clutch, in the operation of which the timing of the disengagement of the lock up clutch, during the process of the transmission performing an upshift from one of its speed stages to the next higher speed stage, is somewhat delayed from the time of initiation of the upshifting process.

It is a further object of the present invention to provide a control system for a hydraulically controlled transmission including a fluid torque converter with a lock up clutch, in the operation of which the timing of the disengagement of the lock up clutch, during the process of the transmission performing an upshift from one of its speed stages to the next higher speed stage, is somewhat delayed from the time of initiation of the upshifting process, as in the object specified above; and in which the extent of said delaying is varied according to which speed stages are being shifted between.

It is a further object of the present invention to provide a control system for a hydraulically controlled transmission including a fluid torque converter with a lock up clutch, in the operation of which the timing of the disengagement of the lock up clutch, during the process of the transmission performing a downshift from one of its speed stages to the next lower speed stage, is somewhat advanced before the time of initiation of the downshifting process.

It is a further object of the present invention to provide a control system for a hydraulically controlled transmission including a fluid torque converter with a lock up clutch, in the operation of which the timing of the disengagement of the lock up clutch, during the process of the transmission performing a downshift from one of its speed stages to the next lower speed stage, is somewhat advanced before the time of initiation of the downshifting process, as in the object specified above; and in which the extent of said advancing is varied according to which speed stages are being shifted between.

It is a further object of the present invention to provide a control system for a hydraulically controlled transmission including a fluid torque converter with a lock up clutch, which is an electronic control system, and which can control the timing of disengagement and engagement of the lock up clutch, during the process of the transmission changing between its speed stages.

It is a further object of the present invention to provide such an electronic control system for a hydraulically controlled transmission including a fluid torque converter with a lock up clutch, in which the advantage obtained by the electronic switching of the transmission is utilized to the maximum, by controlling the transmission and the lock up clutch in an accurate and flexible fashion.

It is a yet further object of the present invention to provide a control system for a hydraulically controlled transmission including a fluid torque converter with a lock up clutch, which provides good drivability for the vehicle incorporating the transmission.

It is a yet further object of the present invention to provide a control system for a hydraulically controlled transmission including a fluid torque converter with a lock up clutch, which provides good fuel economy for the vehicle incorporating the transmission.

It is a yet further object of the present invention to provide a control system for a hydraulically controlled transmission including a fluid torque converter with a lock up clutch, which does not deteriorate the service life of the automatic transmission.

It is a yet further object of the present invention to provide a control system for a hydraulically controlled transmission including a fluid torque converter with a lock up clutch, in which the reliability during use of the automatic transmission is preserved.

It is a yet further object of the present invention to provide a control system for a hydraulically controlled transmission including a fluid torque converter with a lock up clutch, in which traffic danger due to sudden transmission shift shock is avoided.

It is a yet further object of the present invention to provide a control system for a hydraulically controlled transmission including a fluid torque converter with a lock up clutch, in which racing of the engine of the vehicle is avoided.

It is a yet further object of the present invention to provide a control system for a hydraulically controlled transmission including a fluid torque converter with a lock up clutch, in which variations in the construction of the transmission and of the control system due to the latitude inherent in manufacturing tolerances do not adversely affect the performance of the transmission and of the control system.

It is a yet further object of the present invention to provide a control system for a hydraulically controlled transmission including a fluid torque converter with a lock up clutch, in which alterations in the viscosity of the hydraulic fluid in the transmission do not adversely affect the performance of the transmission and of the control system.

It is a yet further object of the present invention to provide a control system for a hydraulically controlled transmission including a fluid torque converter with a lock up clutch, in which alterations in the temperature of the hydraulic fluid in the transmission do not adversely affect the performance of the transmission and of the control system.

It is a yet further object of the present invention to provide such a control system for a hydraulically controlled transmission including a fluid torque converter with a lock up clutch, in which the manufacture and assembly is easy.

It is a yet further object of the present invention to provide a control system for a hydraulically controlled transmission including a fluid torque converter with a lock up clutch, in the operation of which engine stalling is positively prevented, even when the braking system of the vehicle is applied.

It is a yet further object of the present invention to provide a control system for a hydraulically controlled transmission including a fluid torque converter with a lock up clutch, in the operation of which transmission torque shock caused by the throttle of the vehicle being suddenly opened from the closed condition while the lock up clutch is engaged, is positively prevented.

BRIEF DESCRIPTION OF THE DRAWINGS

The present invention will now be shown and described with reference to a preferred embodiment thereof, and with reference to the illustrative drawings. It should be clearly understood, however, that the description of the embodiment, and the drawings, are all of them given purely for the purposes of explanation and exemplification only, and are none of them intended to be limitative of the scope of the present invention in any way, since the scope of the present invention is to be defined solely by the legitimate and proper scope of the appended claims. In the drawings:

FIG. 7 is yet another partial flowchart, following on from FIG. 6, showing yet another part of the operation of said control computer;

FIG. 8 is a final partial flowchart, following on from FIG. 7 and leading back to FIG. 5, showing yet another part of the operation of said control computer;

FIG. 9a is a time chart, relating to an upshift of the transmission when the lock up clutch is engaged before the upshift, showing the mutual relationships of three time intervals T1, T2, and T3 that are set by the preferred embodiment of the transmission control device according to the present invention shown in FIG. 1; and FIG. 9b is a similar time chart, relating to a downshift of the transmission when the lock up clutch is engaged before the downshift, in which time chart the time interval T2 is shown as being zero;

FIG. 10 is an explanatory table, showing how certain values for the above mentioned three time intervals T1, T2, and T3 are stored in a table in the control computer mentioned above;

FIG. 11 is a set of three explanatory synchronized graphs, in which time is the abscissa and respectively engine rotational speed, transmission power output shaft torque, and hydraulic fluid pressure are the ordinates, showing, for the case when the lock up clutch is not disengaged during a transmission upshift from second speed stage to third speed stage in drive or "D" range;

FIG. 12 is another set of three explanatory synchronized graphs, similar to FIG. 11, for the case when the lock up clutch is disengaged during a transmission upshift from second speed stage to third speed stage in drive or "D" range, with the time point of commencement of disengagement of the lock up clutch substantially simultaneous with the time point of commencement of change over of speed stages;

FIG. 13 is yet another set of three explanatory synchronized graphs, similar to FIGS. 11 and 12, for the case when the lock up clutch is disengaged during a transmission upshift from second speed stage to third speed stage in drive or "D" range, with the time point of commencement of disengagement of the lock up clutch delayed by a certain time interval T2-T1 from the time point of commencement of change over of speed stages, according to the transmission control method according to the present invention.

DESCRIPTION OF THE PREFERRED EMBODIMENT

Now, the present invention will be explained with respect to a particular embodiment thereof, and with reference to the accompanying drawings.

Figures 1, 2:
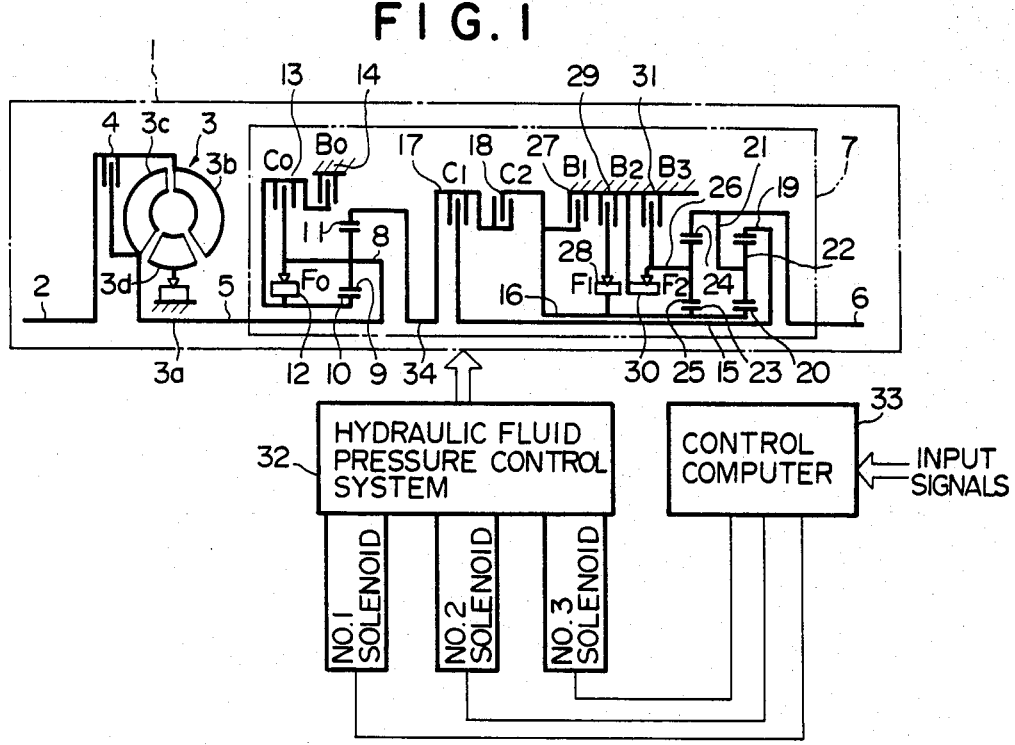
FIG. 1 is a schematic drawing, diagrammatically showing an example of a hydraulically controlled transmission which has four speed stages including an overdrive speed stage, and which is suitable to be controlled by a transmission control method of the present invention.
FIG. 2 is a table which shows, for each of the possible ranges which can be set on a manual range selection valve, and for each speed stage which can be attained in the set range, the energization or non energization condition of each of three solenoids of the transmission control device according to the present invention shown in FIG. 1, the supply or non supply condition of actuating hydraulic fluid pressure.

In FIG. 1 there is shown a schematic structural diagram of a hydraulically controlled transmission, generally designated by the reference numeral 1, which is of a type which is per se well known, and which has been disclosed in the previously identified and discussed Japanese Patent Application No. 69110/80 and U.S. patent application No. 06/263,261.

This hydraulically controlled transmission 1 includes a torque converter 3 with a lock up clutch 4 and an gear transmission mechanism 7 which provides four forward speed stages and one reverse speed stage, and is controlled by the preferred embodiment of the transmission control device according to the present invention (which comprises elements denoted by the reference numerals 32 and 33 as will be seen later), according to the preferred embodiment of the transmission control method according to the present invention. This gear transmission mechanism 7, in its general structure, comprises an overdrive mechanism and a gearbox. The overdrive mechanism comprises a plurality of hydraulic fluid pressure activated friction engaging mechanisms which will be described later, and, according to selective supply of hydraulic fluid pressure to these hydraulic fluid pressure activated friction engaging mechanisms, can provide either a directly connected speed stage or an overdrive speed stage which is higher geared than said directly connected speed stage. The gearbox comprises a plurality of hydraulic fluid pressure activated friction engaging mechanisms which will be described later, and, according to selective supply of hydraulic fluid pressure to these hydraulic fluid pressure activated friction engaging mechanisms, can provide either one of a first forward speed stage, a second forward speed stage which is higher geared than said first forward speed stage, a third forward speed stage which is higher geared than said first and second forward speed stages and in fact in the shown exemplary gearbox is a directly connected speed stage, and a reverse speed stage. Therefore, as a whole, the gear transmission mechanism 7 can provide any one of four forward speed stages including a directly connected third speed stage and an overdrive fourth overdrive speed stage, or a reverse speed stage, according to selective supply of hydraulic fluid pressures to these various friction engaging mechanisms.

Now the torque converter 3 will be described. This torque converter 3 is of a per se well known sort, and comprises a power output shaft or turbine shaft 3a, a pump impeller 3b, a turbine 3c, and a stator 3d. The stator 3d is mounted, via a one way brake, so as to be freely rotatable (in a preferred direction of rotation) with respect to the body of the torque converter 3. The pump impeller 3b is connected to an input shaft 2 of the torque converter 3, and this input shaft 2, in fact, during use of this automatic transmission, is connected to a crankshaft of an internal combustion engine, not shown in the figures, so as to receive input of rotational power therefrom. The turbine 3c is connected to a turbine shaft 3a, which serves as a power output shaft for the torque converter 3.

The overdrive mechanism will now be described. This overdrive mechanism comprises an overdrive casing, and the turbine shaft 3a is connected to a power input shaft 5 of the overdrive mechanism, so as to transmit rotational power from the torque converter 3 to the overdrive mechanism. This power input shaft 5 is connected to a carrier 8 of a planetary gear mechanism of the overdrive mechanism, and on the carrier 8 there is rotatably mounted a planetary pinion 9 (of course, in fact, several planetary pinions such as 9 are incorporated in this planetary gear mechanism, but only one of them is schematically shown in FIG. 1), and this planetary pinion 9 rotates in a per se conventional way around a sun gear 10. The outside of the planetary pinion 9 is meshed with a ring gear 11. Between the sun gear 10 and the carrier 8 there are provided, in parallel, a one way clutch ($F_0$) 12 and a multi plate clutch ($C_0$) 13, for selectively rotationally connecting them together, and, further, between the sun gear 10 and the casing of the overdrive mechanism there is provided a multi plate brake ($B_0$) 14, for selectively rotationally connecting them together. The multi plate clutch 13 and the multi plate brake 14 are both of them constituted as hydraulic fluid pressure activated friction engaging mechanisms, and are both of them adapted to be selectively engaged and disengaged by selective supply of hydraulic fluid pressure thereto from the preferred embodiment of the transmission control device according to the present invention, as will be explained later. The ring gear 11 is connected to a shaft 34, which serves as the power output shaft of the overdrive mechanism. Thus the overdrive mechanism, according to selective supply of hydraulic fluid pressure to these hydraulic fluid pressure activated friction engaging mechanisms $C_0$ and $B_0$, can provide either a directly connected speed stage or an overdrive speed stage which is higher geared than said directly connected speed stage.

Now, the gearbox will be described. This gearbox is provided with a power output shaft 6, and the shaft 34 serves as a power input shaft for the gearbox. A multi plate clutch ($C_1$) 17 is provided between the shaft 34 and an intermediate shaft 15, for selectively rotationally connecting them together, and a multi plate clutch ($C_2$) 18 is also provided between the shaft 34 and a sun gear shaft 16, for selectively rotationally connecting them together. A multi plate brake ($B_1$) 27 is provided between the sun gear shaft 16 and the transmission casing, for selectively rotationally engaging them together. Between the sun gear shaft 16 and the transmission casing, further, in series, there are provided a one way clutch ($F_1$) 28 and a multi plate brake ($B_2$) 29, for selectively rotationally engaging them together in one rotational direction only.

Two coaxial sun gears 20 and 23 are provided on the sun gear shaft 16, and these two sun gears 20 and 23 are used in two separate planetary gear mechanisms, which are axially spaced along the axis of said sun gear shaft 16. In the first planetary gear mechanism, a carrier 21 carries a planetary pinion 22 (actually, of course, again in fact a plurality of such planetary pinions 22 are provided, but only one is schematically shown in FIG. 1) which is meshed at its inside with the sun gear 20, and at its outside with a ring gear 19. In the second planetary gear mechanism, a carrier 26 carries a planetary pinion 25 (actually, again, a plurality of such planetary pinions 25) which is meshed at its inside with the sun gear 23, and at its outside with a ring gear 24. The ring gear 19 of the first planetary gear mechanism is connected to the aforesaid intermediate shaft 15. The carrier 21 of this first planetary gear mechanism is connected to the ring gear 24 of the second planetary gear mechanism, and both of these elements are connected to the power output shaft 6 of the gearbox, said power output shaft 6 leading to the driven wheels of the vehicle to which the shown automatic transmission is fitted. Further, between the carrier 26 of the second planetary gear mechanism and the transmission casing there are provided, in parallel, a multi plate brake ($B_3$) 31 for selectively engaging them together, and a one way brake ($F_2$) 30.

Again, the multi plate clutches 17 and 18 and the multi plate brakes 27, 29, and 31 are constituted as hydraulic fluid pressure activated friction engaging mechanisms, and are adapted to be selectively engaged and disengaged by selective supply of hydraulic fluid pressure thereto from the preferred embodiment of the transmission control device according to the present invention, as will be explained later, and by this selective engagement and disengagement of these various hydraulic fluid pressure activated multi plate clutches and brakes $C_1$, $C_2$, $B_1$, $B_2$, and $B_3$ the gearbox may be set to any one of its three forward speed stages, which are: a first speed stage, a second speed stage which is higher geared than said first speed stage, and a third speed stage which is higher geared than said first and second speed stages and which is a directly connected speed stage; and also may be set to its reverse speed stage. Thus, considering the gear transmission mechanism 7 as a whole, i.e. the combination of the overdrive mechanism and the gearbox, said gear transmission mechanism 7 may be set, by selective engagement and disengagement of the various hydraulic fluid pressure activated multi plate clutches and brakes, to its various forward speed stages, which are: a first speed stage, a second speed stage which is higher geared than said first speed stage, a third speed stage which is higher geared than said first and second speed stages and which is a directly connected speed stage, and a fourth speed stage which is higher geared than said directly connected speed stage and which is an overdrive speed stage; and to a reverse speed stage. The combinations of the clutches and brakes, described above, which should be engaged and disengaged, in order to provide each of the above described speed stages from the combination of the overdrive mechanism and the gearbox, i.e. from the gear transmission mechanism 7, for each range of speed stages selected on a manual range selection valve of the vehicle in which this transmission is fitted, are shown in FIG. 2, as will be explained later.

There are also shown in FIG. 1 a hydraulic fluid pressure control system 32 together with three associated solenoids S1, S2, and S3 and a digital control computer 33, which together are comprised in a control device for the hydraulically controlled transmission 1 whose large scale mechanical components have been described above, said control device shown being a preferred embodiment of the transmission control device according to the present invention. No particular details will be given of the hydraulic circuits in the hydraulic fluid pressure control system 32 or of the way in which said hydraulic fluid pressure control system 32 selectively supplies actuating hydraulic fluid pressures to the various hydraulically activated clutches and brakes $C_1$, $C_2$, $B_1$, $B_2$, and $B_3$ of the hydraulically controlled transmission 1 according to the selective energization of the solenoids S1 and S2, because most of the construction of said hydraulic fluid pressure control system 32 is explained in detail in the above identified previous Japanese and U.S. patent applications, and the other details will be easily filled in by one of ordinary skill in the art, based upon the disclosure herein. Further, no particular details will be given of the way in which said hydraulic fluid pressure control system 32 selectively supplies actuating hydraulic fluid pressures to control the lock up clutch 4 according to the selective energization of the associated solenoid S3, because in fact this control is performed by means of a lock up clutch control valve similar to the type discussed herein before in the section of this specification entitled "BACKGROUND OF THE INVENTION", except that the lock up clutch control valve is switched between its two positions, not by the supply of any so called control hydraulic fluid pressure, but by the solenoid S3, either directly or indirectly; the details of this valve may, again, be easily filled in by one of ordinary skill in the art, based upon the disclosure herein. Functionally, the combination of the hydraulic fluid pressure control system 32 and the three associated solenoids S1, S2, and S3 provides the correct hydraulic fluid pressures to the lock up clutch 4 of the hydraulically controlled transmission 1 to engage the lock up clutch 4 if and only if the third solenoid S3 is supplied with actuating electrical energy (i.e. is excited); and provides the correct hydraulic fluid pressures to the gear transmission mechanism 7: to engage the first speed stage of said gear transmission mechanism 7 if and only if the first solenoid S1 is supplied with actuating electrical energy (i.e. is excited) and the second solenoid S2 is not supplied with actuating electrical energy (i.e. is not excited); to engage the second speed stage of said gear transmission mechanism 7 if and only if the first solenoid S1 is supplied with actuating electrical energy (i.e. is excited) and the second solenoid S2 is supplied with actuating electrical energy (i.e. is excited); to engage the third speed stage of said gear transmission mechanism 7 if and only if the first solenoid S1 is not supplied with actuating electrical energy (i.e. is not excited) and the second solenoid S2 is supplied with actuating electrical energy (i.e. is excited); and to engage the overdrive speed stage of said gear transmission mechanism 7 if and only if the first solenoid S1 is not supplied with actuating electrical energy (i.e. is not excited) and the second solenoid S2 is not supplied with actuating electrical energy (i.e. is not excited).

In FIG. 2, there is given a table which shows, for each of the possible ranges which can be set on the manual range selection valve of the vehicle, and for each speed stage which can be attained in the set range, the energization or non energization condition by the control computer 33 of each of the three solenoids S1, S2, and S3, the supply or non supply condition of actuating hydraulic fluid pressure from the hydraulic fluid pressure control system 32 to each of the hydraulic fluid pressure actuated friction engaging mechanisms $C_0$, $B_0$, $C_1$, $C_2$, $B_1$, $B_2$, and $B_3$ of the gear transmission mechanism 7, and the engaged or overrunning conditions of the one way clutches and brakes $F_0$, $F_1$, and $F_2$. In this table, the symbol "D" denotes drive range, the symbol "3" denotes three range, the symbol "L" denotes low range, the symbol "R" denotes reverse range, the symbol "P" denotes parking range, the symbol "N" denotes neutral range, the symbol "1st" denotes the first speed stage, the symbol "2nd" denotes the second speed stage, the symbol "3rd" denotes the third speed stage, the symbol "O/D" denotes the overdrive speed stage, and the symbol "Rev" denotes the reverse speed stage. Further, the symbol n relating to a solenoid denotes non energization, the symbol E relating to a solenoid denotes energization, the symbol (E) relating to the solenoid S3 denotes possible energization (when and only when it is desired to engage the lock up clutch 4), the symbol E relating to a friction engaging mechanism denotes engagement of the friction engaging mechanism or supply of actuating hydraulic fluid pressure to the friction engaging mechanism, and the symbol E relating to a one way clutch or brake denotes operation in the engaged condition during engine drive.

The control computer 33 selectively supplies actuating electrical energy to the three solenoids S1, S2, and S3, in order to engage the lock up clutch 4 or not as desired, and in order to engage the desired speed stage of the gear transmission mechanism 7, via D/A converters and the like of per se well known types which will not be further described here, based upon the results of calculations which said control computer 33 makes, based upon various input data which said control computer 33 receives, from sensors and via A/D converters and the like of per se well known types which will not be further described here, relating to vehicle operational conditions such as vehicle speed, throttle opening, shift range which is currently selected on the manual range selection valve, height above sea level at which the vehicle is currently operating, engine temperature, and the like. The method of operation of this control computer 33 which takes place during the practice of the preferred embodiment of the transmission control method according to the present invention by the preferred embodiment of the transmission control device according to the present invention, which comprises the combination of the hydraulic fluid pressure control system 32 and the three associated solenoids S1, S2, and S3 as well as the control computer 33, will now be explained. It will be understood by one of ordinary skill in the art that the control computer 33 may be a so called microcomputer, comprising a CPU, ROM, RAM, input and output ports, and the like; many such computers are well known and conventional.

Figure 3:
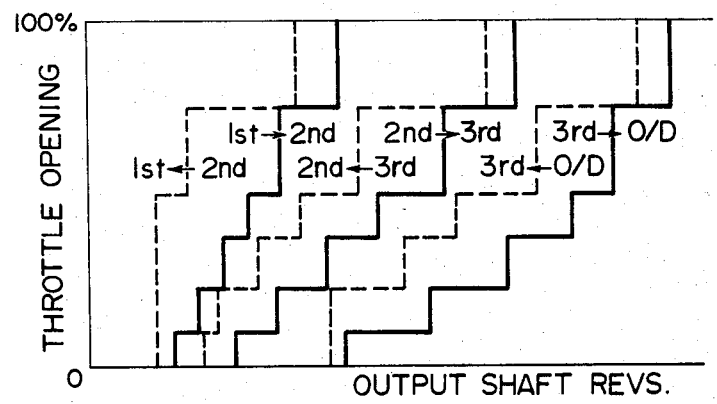
FIG. 3 is a graph, in which power output shaft revolution speed, i.e. vehicle speed, is the abscissa, and throttle opening, i.e. engine load, is the ordinate, relating specifically and only to operation in the drive or "D" range, showing upshift lines downshift lines.

First, with respect to the operation of the control computer 33 for deciding to which speed stage of its forward speed stages the hydraulically controlled transmission 1 should be set, when the manual range selection valve (not particularly shown) is set to a forward driving range, i.e. to the drive or "D" range, to the third or "3" range, or to the low or "L" range: this decision is made on the basis of a set of upshift and downshift lines between each possible pair of adjacent speed stages which can be attained in the set speed range. In the digital control computer 33, these upshift and downshift lines are each stored as an explicit digital relationship between throttle opening (which is indicative of engine load) and transmission output shaft revolution speed (which is proportional to vehicle road speed), rather than being implicit in the operation of the transmission control system, as the corresponding theoretically well known upshift and downshift lines are in the case of a conventional hydraulic fluid pressure transmission control system, which practices analog computation. It will be easily understood that this explicit storing of the upshift and downshift lines in the form of digital relationships such as tables is very flexible, and can be easily adapted to virtually any form of upshift and downshift lines that is required, by contrast to the usual or conventional analog method of obtaining these upshift and downshift lines, with the aforesaid conventional hydraulic analog computation system, which is not very flexible with regard to its operational characteristics. FIG. 3 is a graph, in which power output shaft revolution speed, i.e. vehicle speed, is the abscissa, and throttle opening, i.e. engine load, is the ordinate, relating specifically and only to operation in the drive or "D" range, showing upshift lines for from first speed stage to second speed stage, from second speed stage to third speed stage, and from third speed stage to overdrive speed stage, and also showing downshift lines for from second speed stage to first speed stage, from third speed stage to second speed stage, and from overdrive speed stage to third speed stage, for the hydraulically controlled transmission shown in FIG. 1 when said transmission is being controlled by the preferred embodiment of the transmission control device according to the present invention shown in FIG. 1 according to the preferred embodiment of the transmission control method according to the present invention. That is to say, as will be explained in more detail later, the digital control computer 33 inputs various data representative of vehicle operational parameters from various sensors of per se well known sorts via A/D converters and the like which are also per se well known, including data relating to engine throttle opening and transmission power output shaft revolution speed, and from this data determines from moment to moment the path on the graph of FIG. 3 taken by the point representing the transmission operational conditions. According to the traversing of the various shown upshift and downshift lines, therefore, the computer 33 dispatches instructions to the solenoids S1 and S2 to engage the various ones of the friction engaging means of the gear transmission mechanism 7 which will cause the proper speed stages of the transmission to be engaged, as will be more fully explained later with reference to the flowcharts given to FIGS. 5 through 8. In FIG. 3, the separation between the upshift and downshift lines between each pair of speed stages is related to the well known concept of providing a hysteresis effect in the operation of the transmission to change between its speed stages. Further, other combinations of upshift and downshift lines like the lines shown in FIG. 3 are also stored by the computer 33, relative to other speed ranges.

Figure 4:
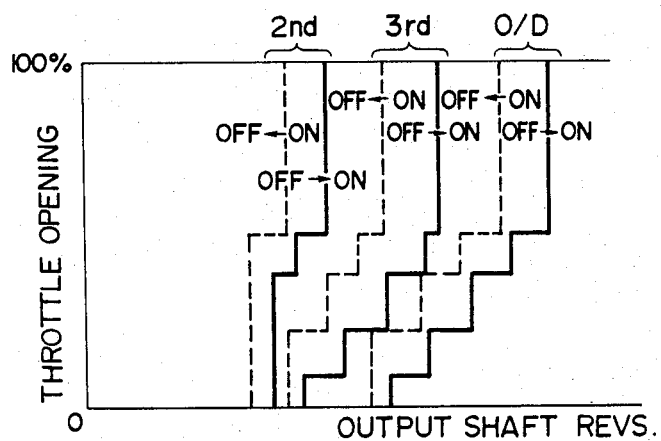
FIG. 4 is a graph, in which power output shaft revolution speed, i.e. vehicle speed, is the abscissa, and throttle opening, i.e. engine load, is the ordinate, relating specifically and only to operation in the drive or "D" range, showing engagement lines (i.e. OFF to ON lines) for the lock up clutch.

Next, with respect to the operation of the control computer 33 for deciding whether or not the lock up clutch 4 of the hydraulically controlled transmission 1 should be engaged or disengaged, when the manual range selection valve is set to a forward driving range, i.e. to the drive or "D" range, to the third or "3" range, or to the low or "L" range: similarly, this decision is made on the basis of a pair of engage and disengage lines relating to each possible one of the speed stages which can be attained in the set speed range. In the digital control computer 33, these engage and disengage lines are again stored as explicit digital relationships between throttle opening (which is indicative of engine load) and transmission output shaft revolution speed (which is proportional to vehicle road speed), rather than being implicit in the operation of the transmission control system, as the corresponding theoretically well known engage and disengage lines are in the case of highest speed stage operation in the drive or "D" range of a conventional hydraulic fluid pressure lock up clutch control system incorporated in a conventional hydraulic fluid pressure transmission control system, which practices analog computation. Again, it will be easily understood that this explicit storing of the engage and disengage lines in the form of digital relationships such as tables is very flexible, and can be easily adapted to virtually any form of engage and disengage lines that is required, by contrast to the usual or conventional analog method of obtaining these engage and disengage lines, with the aforesaid conventional hydraulic analog computation system, which is not very flexible with regard to its operational characteristics. FIG. 4 is a graph, in which power output shaft revolution speed, i.e. vehicle speed, is the abscissa, and throttle opening, i.e. engine load, is the ordinate, relating specifically and only to operation in the drive or "D" range, showing engagement lines (i.e. OFF to ON lines) for the lock up clutch 4 of the hydraulically controlled transmission shown in FIG. 1 when the transmission is in second speed stage, third speed stage, and overdrive speed stage, and also showing disengagement lines (i.e. ON to OFF lines) for said lock up clutch 4 when the transmission is in second speed stage, third speed stage, and overdrive speed stage, when said transmission is being controlled by the preferred embodiment of the transmission control device according to the present invention shown in FIG. 1 according to the preferred embodiment of the transmission control method according to the present invention. That is to say, as will be explained in more detail later, the digital control computer 33, from the previously mentioned inputted data determines from moment to moment the path on the graph of FIG. 4 taken by the point representing the transmission operational conditions. According to the traversing of the various shown engage and disengage lines, therefore, the computer 33 dispatches instructions to the solenoid S3 to engage or to disengage the lock up clutch 4, as will be more fully explained later with reference to the flowcharts given in FIGS. 5 through 8. In FIG. 4, the separation between the engage and disengage lines for each speed stage is related to the concept of providing a hysteresis effect in the operation of the lock up clutch 4, with respect to its engagement and disengagement, so as to avoid hunting of the lock up clutch 4, i.e. repeated engagement and disengagement thereof within a short time period. Further, other combinations of upshift and downshift lines like the lines shown in FIG. 3 are also stored by the computer 33, relative to other speed ranges.

According to the operation of the control computer 33 generally described above, there is no problem when the control computer 33 decides that it is the proper time to engage the lock up clutch 4 from the disengaged condition during the engagement of any one speed stage of the gear transmission mechanism 7, or to disengage the lock up clutch 4 from the engaged condition during the engagement of any one speed stage, and of course when the control computer 33 decides that it is the proper time to change from one speed stage of the gear transmission mechanism 7 to another speed stage, while the lock up clutch 4 is disengaged, no problem arises either; but, when the control computer 33 decides that it is the proper time to change from one speed stage of the gear transmission mechanism 7 to another speed stage, while the lock up clutch 4 is engaged, whether or not the lock up clutch 4 is to be engaged or disengaged after engagement of the new speed stage, a problem arises of the timing of the disengagement of the lock up clutch 4 during the actual process of change of speed stage, as has been explained above in the parts of this specification entitled "BACKGROUND OF THE INVENTION" and "SUMMARY OF THE INVENTION". Further, if the lock up clutch 4 is to be engaged after engagement of the new speed stage, a problem arises of the timing of the reengagement of the lock up clutch 4 during or after the actual process of change of speed stage of the gear transmission mechanism 7. That is to say, if the timing is not exactly right for the engagement and disengagement of the lock up clutch during change of the transmission speed stage, then danger exists either of the occurrence of unacceptably great variations in the output shaft torque of the automatic transmission, which can cause uncomfortable driving and premature deterioration of the components of the gear transmission mechanism 7, or of the occurrence of unacceptably great variations in the engine rotational speed, i.e. of engine racing, which can cause premature excessive wear to, or even catastrophic failure of, the vehicle engine. Further, as will be easily appreciated, this timing for the engagement and disengagement of the lock up clutch during change of the transmission speed stage will probably be different for the various combinations of transmission speed stages which are to be shifted between, i.e. the first speed stage to and from the second speed stage, the second speed stage to and from the third speed stage, and the third speed stage to and from the overdrive speed stage, in the case of the transmission shown in the figures and described herein.

Now the way of operation of the control computer 33 will be explained which solves these problems satisfactorily, and which causes the transmission control device comprising the digital control computer 33 and the hydraulic fluid pressure control system 32, which is the preferred embodiment of the transmission control device according to the present invention, to practice the preferred embodiment of the transmission control method according to the present invention, with the aid of a flowchart of the control program stored therein. In fact, this flowchart is for the convenience of display and explanation split up into four partial flowcharts, which are shown in FIGS. 5 through 8. The flowchart of FIG. 5 leads into the flowchart of FIG. 6, via the junction point "a"; the flowchart of FIG. 6 leads into the flowchart of FIG. 7, via the junction point "b"; the flowchart of FIG. 7 leads into the flowchart of FIG. 8, via the junction point "c"; and the flowchart of FIG. 8 returns back to the flowchart of FIG. 5 in a form of repeated loop of control flow which is per se well known in the field of computer process control, via the junction point "d". In fact the actual computer program of the computer 33 is written in a computer language, and an understanding of its details is not necessary for understanding the principle of the present invention; many variations could be made without departing from the spirit of the present invention, and accordingly no more detail will be given of the computer program of the computer 33 in this preferred embodiment of the present invention than will be required by a person skilled in the art, who will be well able to fill in all the omitted detail if he requires to do so, based upon the disclosure contained herein.

Control starts in the START block, in which the various flags and other variables of the program are initialized, as will be detailed later. Then control passes to enter next the DATA INPUT block.

In the DATA INPUT block, data is read into the computer 33 relating to: the vehicle speed (actually the speed of rotation of the power output shaft 6 of the gear transmission mechanism 7, which is proportional to the vehicle speed); throttle opening or boost pressure; the position of the manual range selection valve which is operated by hand by the driver of the vehicle to select and set an appropriate range for operation of the transmission, such as drive or "D" range, third or "3" range, low or "L" range, reverse or "R" range, neutral or "N" range, and parking or "P" range; and whether the braking system of the vehicle is being applied at the moment or not. Then control passes to enter the RANGE? decision block.

In the RANGE? decision block, a decision is made as to whether or not a forward driving range is currently set on the manual range selection valve. If NO, then control passes to enter next the SET LOCK UP CLUTCH OFF block, and if YES, then control passes to enter next the SELECT SPEED CHANGE AND LOCK UP CLUTCH GRAPHS block.

In the SET LOCK UP CLUTCH OFF block, the control computer 33 outputs the proper signals to the solenoid S3 to cause the lock up clutch 4 of the gear transmission mechanism 7 to be disengaged. The control passes to enter next the DATA INPUT block, and recycles. Thus, if the vehicle is being operated in any of the reverse or "R" range, the neutral or "N" range, or the "P" or parking range, the lock up clutch 4 is kept disengaged.

In the SELECT SPEED CHANGE AND LOCK UP CLUTCH GRAPHS block, the particular one of the transmission speed change graphs and the lock up clutch engagement and disengagement graphs (like, for instance, the graphs shown in FIGS. 3 and 4) relating to the transmission range currently set on the manual range selection valve are selected. Then control passes to enter next the CLUTCH ON? decision block.

In the CLUTCH ON? decision block, a decision is made as to whether the lock up clutch 4 is engaged or not. If NO, then control passes to enter next the SPEED CHANGE? decision block. If YES, then control passes to enter next the F1=1? decision block.

In the F1=1? decision block, if NO and thus the flag F1 is currently set to zero, then control passes to enter next the TM3=0 block which resets the timer TM3 to zero, and otherwise this block is skipped; in any case, control passes to enter next the SPEED CHANGE? decision block.

In the SPEED CHANGE? decision block, a decision is made as to whether, based upon the current values of operational parameters of the vehicle and on the speed change graph which was selected in the SELECT SPEED CHANGE AND LOCK UP CLUTCH GRAPHS block, the currently set speed of the gear transmission mechanism 7 should be changed. If NO, then control passes to the point a in the flowchart of FIG. 6, i.e. passes to enter next the UPSHIFT? decision block in FIG. 6, while if YES then a test is made as to whether the flag F1 is equal to 1 or not, in the F1=1? decision block. If F1 is not equal to 1, then F1 is set equal to 1 and the timer TM1 is reset to zero, in the F1=1, TM1=0 block; but if the flag F1 is equal to 1 then this step is skipped and control passes to the point a, so as to enter next the UPSHIFT? decision block in FIG. 6.

Figure 6:
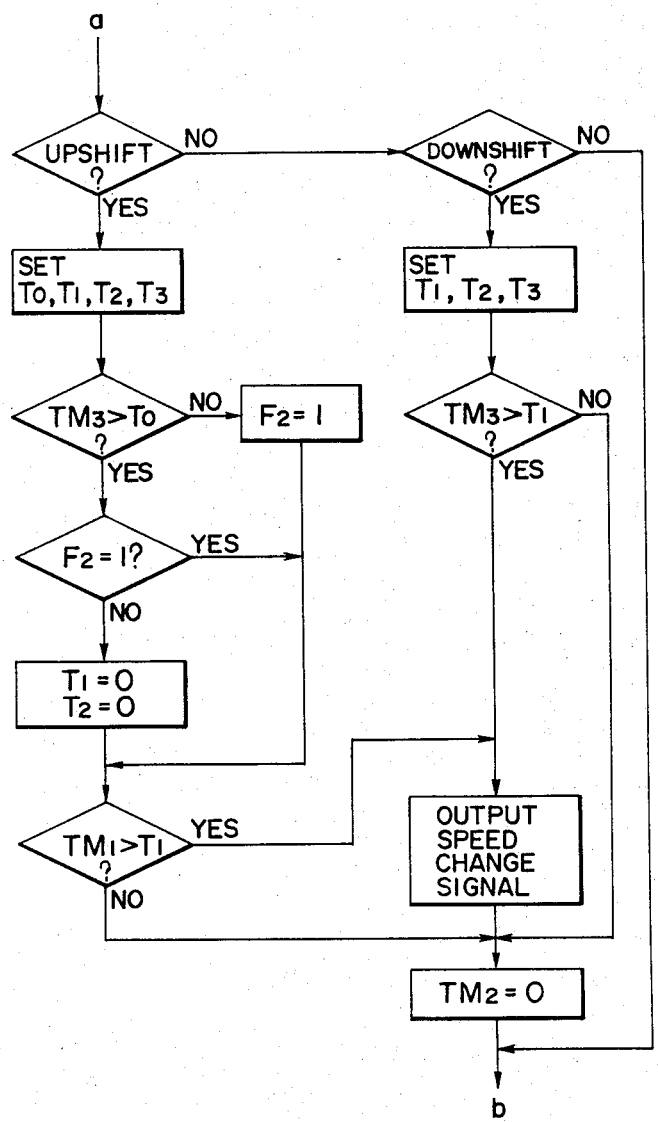
FIG. 6 is another partial flowchart, following on from FIG. 5, showing another part of the operation of said control computer.

In the UPSHIFT? decision block in FIG. 6, a decision is made as to whether an upshift is being required (similarly to the decision made in the SPEED CHANGE? decision block), and if NO then control passes next to enter the DOWNSHIFT? decision block, wherein a decision is made as to whether a downshift is being required. If NO is the result of this decision, then no shift either up or down is being required from the gear transmission mechanism 7, and control passes next to the point b in the flowchart of FIG. 7, i.e. control passes next to enter the BRAKE ON? decision block in FIG. 7.

If, however, an upshift is being required, i.e. there is a YES decision in the UPSHIFT? decision block, then control passes next to enter the SET T0, T1, T2, T3 block.

In this SET T0, T1, T2, T3 block, the proper value for the time interval T0 is set, and the proper values for the time intervals T1, T2, and T3 are set, for example by table look up from a table such as the table exemplarily shown in FIG. 10, with reference to the currently set speed stage of the gear transmission mechanism 7 and the current engagement or disengagement state of the lock up clutch 4, i.e. the engagement or disengagement state of the lock up clutch 4 before the speed stage change. With regard to the meaning of these intervals, T0 is a constant time interval for determining, when a change of speed stage is to be made, whether up till that time point the lock up clutch 4 has been engaged or not, as will be more fully described later; T1 is the proper time interval from the instant that a speed stage change decision is made, i.e. from the instant that the timer TM1 is reset as will be explained later, to the instant at which a speed stage change signal is to be output; T2 is the proper time interval from the instant that a speed stage change decision is made to the instant at which a lock up clutch disengage signal is to be output; and T3 is the proper time interval from the instant at which a lock up clutch disengage signal is to be output to the instant at which a lock up clutch engage signal ought to be output, in the case that the lock up clutch 4 should be engaged after the change of speed stage, i.e. is the time interval for temporary disengagement of the lock up clutch 4, during this upwards change of transmission speed stage. The relationship of these time intervals, in the case of upshifting when the lock up clutch is engaged before the upshift, may be seen in FIG. 9a and in the case of downshifting when the lock up clutch is engaged before the downshift, may be seen in FIG. 9b, as will be explained later. By consideration of the values shown in FIG. 10 it will be apparent that in the case of upshifting if the lock up clutch 4 is not engaged before the upshift then only T3 is non zero, because only T3 is relevant, since it will be quite in order to output a speed stage change signal as soon as the decision for changing transmission speed stage is made, and since the lock up clutch 4 is already disengaged and hence the time interval between the decision for changing speed stage and the output of the lock up clutch disengage signal is irrelevant. On the other hand, in this case of upshifting if the lock up clutch 4 is engaged before the upshift then all of T1, T2, and T3 are relevant, as seen in FIG. 9a. Control now passes to enter next the TM3 greater than T0? decision block.

It will be clear from the foregoing explanation that, with reference to the upshifting case, because the values of T1, T2, and T3 are derived by a process of table lookup or the like, these values can be suitably altered with reference to the various different combinations of transmission speed stages which are to be shifted between, i.e. the first speed stage to the second speed stage, the second speed stage to the third speed stage, and the third speed stage to the overdrive speed stage, in the case of the transmission shown in the figures and described herein, as is shown in the exemplary table of FIG. 10.

In this TM3 greater than T0? decision block, if TM3 is not greater than T0 then control passes next to enter the F2=1 block, in which the flag F2 is set to 1, and control next passes next to enter the TM1 greater than T1? decision block. On the other hand, if TM3 is greater than T0 then control passes next to the F2=1? decision block, from which, if the flag F2 is not equal to 1, then control passes to enter next the T1=0, T2=0 block, in which T1 and T2 are set equal to 0, and otherwise this block is skipped; in any case control passes next to enter the TM1 greater than T1? decision block.

In this TM1 greater than T1? decision block, a test is made as to whether the elapsed time as measured by the timer TM1 is greater than T1 or not, and if it is then control passes next to enter the OUTPUT SPEED CHANGE SIGNAL block, while otherwise this block is skipped. In this OUTPUT SPEED CHANGE SIGNAL block the control computer 33 outputs to the solenoids S1 and S2 electrical signals suitable to engage those of the friction engaging mechanisms of the gear transmission mechanism 7 which will engage the proper new speed stage of said gear transmission mechanism 7 which is currently desired. In any case, control passes next to enter the block TM2=0, in which the timer TM2 is reset to zero, and whence control passes next to the point b in FIG. 7.

On the other hand, if a downshift is being required, i.e. there is a YES decision in the DOWNSHIFT? decision block, then control passes next to enter the SET T1, T2, T3 block.

In this SET T1, T2, T3 block, the proper values for the time intervals T1, T2, and T3 are determined, again for example by table look up from a table such as the table exemplarily shown in FIG. 10, with reference to the currently set speed stage of the gear transmission mechanism 7 and the current engagement or disengagement state of the lock up clutch 4. With regard to the meaning of these intervals, T1 is the proper time interval from the instant that a speed stage change decision is made, i.e. from the instant that the timer TM1 is reset as will be explained later, to the instant at which a speed stage change signal is to be output, as before; T2 is as will be seen from the table in FIG. 10 zero in every case in this downshift situation, and this means that immediately that a downshift is decided upon a signal for disengagement of the lock up clutch 4 should be output, so that in the case that the lock up clutch 4 was on before the downshift actually the instant of commencement of disengagement of the lock up clutch 4 occurs at a time interval of length T1 before the commencement of actual downshifting; and T3 is the proper time interval from the instant at which a lock up clutch disengage signal is to be output to the instant at which a lock up clutch engage signal ought to be output, i.e. is the time interval for temporary disengagement of the lock up clutch 4, during this downwards change of transmission speed stage. The relationship of these time intervals, in this case of downshifting when the lock up clutch is engaged before the downshift, may be seen in FIG. 9b. By consideration of the values shown in FIG. 10 it will be apparent that in this case of downshifting if the lock up clutch 4 is not engaged before the downshift then only T3 is non zero, because only T3 is relevant, since it will be quite in order to output a speed stage change signal as soon as the decision for changing speed stage is made, and since the lock up clutch 4 is already disengaged and hence the time interval between the decision for changing speed stage and the output of the lock up clutch disengage signal is irrelevant. On the other hand, in this case of downshifting if the lock up clutch 4 is engaged before the downshift then both of T1 and T3 are relevant, as seen in FIGS. 9 and 10. Control now passes to enter next the TM3 greater than T1? decision block.

It will be again clear from the foregoing explanation that, with reference to the downshifting case, because the values of T1, T2, and T3 are derived by a process of table lookup or the like, these values can be suitably altered with reference to the various different combinations of transmission speed stages which are to be shifted between, i.e. the first speed stage from the second speed stage, the second speed stage from the third speed stage, and the third speed stage from the overdrive speed stage, in the case of the transmission shown in the figures and described herein, as is again shown in the exemplary table of FIG. 10.

In this TM3 greater than TM1? decision block, a test is made as to whether the elapsed time as measured by the timer TM3 is greater than T1 or not, and if it is then control passes next to enter the OUTPUT SPEED CHANGE SIGNAL block, while otherwise this block is skipped. In this OUTPUT SPEED CHANGE SIGNAL block, similarly to the previously described case of upshifting, the control computer 33 outputs to the solenoids S1 and S2 electrical signals suitable to engage those of the friction engaging mechanisms of the gear transmission mechanism 7 which will engage the proper new speed stage of said gear transmission mechanism 7 which is currently desired. In any case, control passes next to enter the block TM2=0, in which the timer TM2 is reset, and whence control passes next to the point b in the flowchart of FIG. 7.

The function of the part of the flowchart shown in FIG. 7, from the point b to the point c, is to update the values of the flags F3 and F4, which respectively indicate whether or not the braking system of the vehicle is being applied, and whether or not within the small time interval T4 (which is a constant) the throttle of the vehicle has been closed. In detail, first a test is made as to whether the braking system of the vehicle is being applied, in the BRAKING? decision block, from the input data already mentioned. If the braking system is being applied, then the flag F3 is set equal to 1, and if it is not, then the flag F3 is set equal to zero; in any case, control passes to enter next the THROTTLE CLOSED? decision block.

In the THROTTLE CLOSED? decision block, if the throttle of the vehicle is fully closed then the timer TM4 is reset to zero by control being directed through the TM4=0 block, and otherwise this block is skipped. In any case, next a test is made, in the TM4 greater than T4? decision block, as to whether the time currently measured by the timer TM4 is greater than a fixed time interval T4 or not. If NO, then the flag F4 is set to 1, and otherwise the flag F4 is set to 0. Thus, in summary, at this stage the flag F3 has been set to 1 or 0 according as the braking system of the vehicle is being applied or not, and the flag F4 is 1 or 0 according as the engine throttle of the vehicle has been closed fully at some instant within the time interval of T4 in the past, or not. In any case, control passes next to the point c in the flowchart of FIG. 8.

In FIG. 8, first, in the TM1 greater than T2? decision block, a check is made as to whether the time currently measured by the timer TM1 is greater than T2 or not. If it is not, then the flag F5 is set to zero in the F5=0 block, and control passes to enter next the decision block TM2 greater than T3?. If, on the other hand, the time currently measured by the timer TM1 is greater than T2, then the flag F5 is set to 1 in the F5=1 block, and then, by the decision block CLUTCH TO BE ON? and the blocks F6=0 and F6=1, the flag F6 is set to 0 or 1 according respectively as to whether the lock up clutch 4 should be set to the engaged or the disengaged state, i.e. according respectively as to whether the point representing the current operational condition of the vehicle on the lock up clutch engagement and disengagement graph like FIG. 4 selected as previously explained in the SELECT SPEED CHANGE AND LOCK UP CLUTCH GRAPHS block is in an area indicating engagement or disengagement of the lock up clutch 4, with respect to the new speed stage that the gear transmission mechanism 7 has been shifted to if in fact in the flowchart of FIG. 6 any speed stage change signal was output in the OUTPUT SPEED CHANGE SIGNAL block. Then control passes to enter next the decision block TM2 greater than T3?.

In this decision block TM2 greater than T3?, if in fact the time currently counted on the timer TM2 is greater than the time interval T3, then the flags F1, F2, and F5 are all set to zero in the block F1=0, F2=0, F3=0; and in any case control passes to enter next the decision block F3 . . . F6 ALL ZERO?.

In this decision block F3 . . . F6 ALL ZERO?, the flags F3, F4, F5, and F6 are all tested, and if any one of them is non zero then control passes to enter next the block SET LOCK UP CLUTCH OFF, while if all of these flags F3, F4, F5, and F6 are zero then control passes to enter next the block SET LOCK UP CLUTCH ON. In either case, after the control computer has set the lock up clutch 4 to either the engaged or the disengaged condition, by outputting the correct signals to accomplish this to the solenoid S3, then control passes back to the point d in the flowchart of FIG. 5, so as to recirculate.

Figure 5:
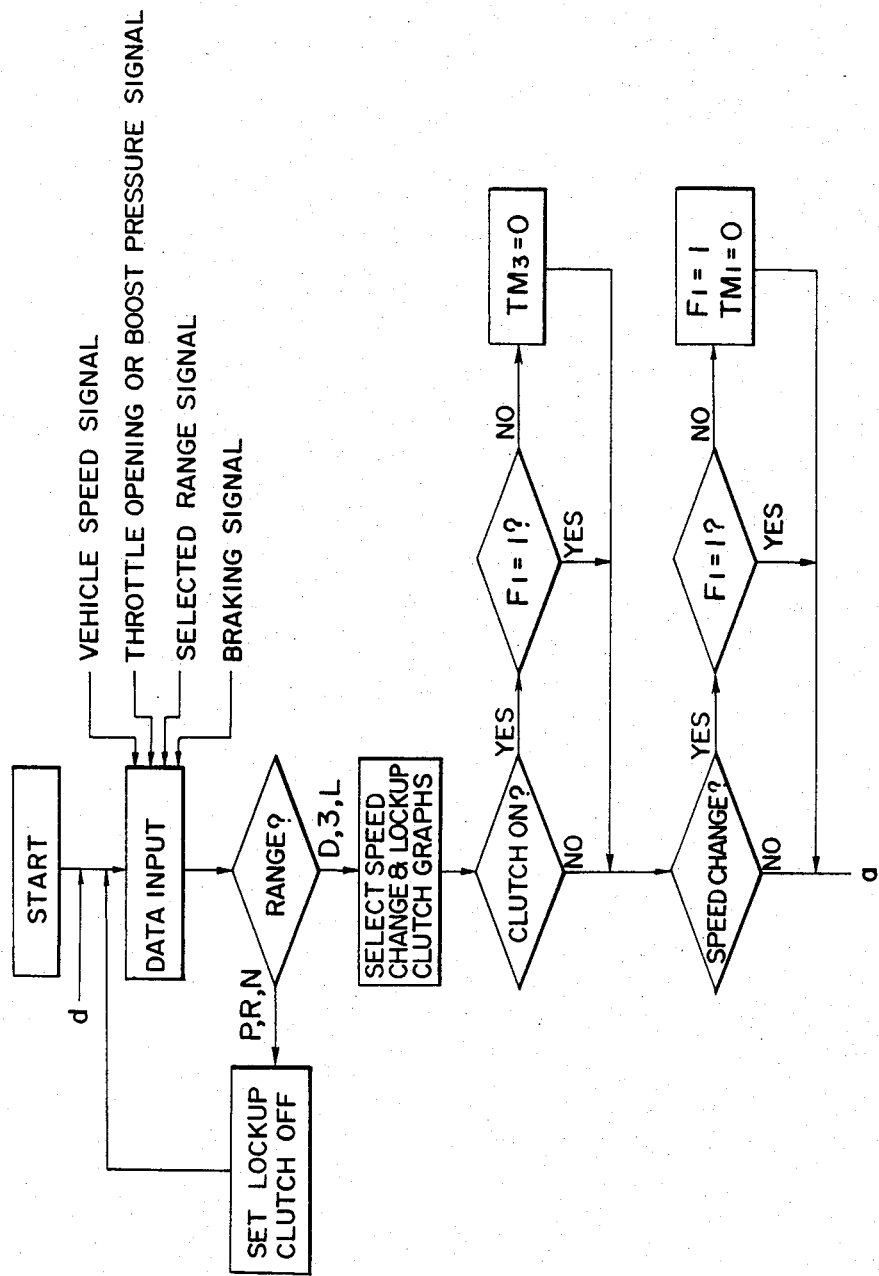
FIG. 5 is a partial flowchart, showing part of the operation of a control computer which is incorporated in the preferred embodiment of the transmission control device according to the present invention shown in FIG. 1 while said device is practicing the preferred embodiment of the transmission control method according to the present invention.

Now, in order to understand the operation of the computer program for the control computer 33 whose flowchart is shown in FIGS. 5 through 8, first it should be noted that, in the case of forward driving, the CPU continues cycling through the program from the point a in FIG. 5 through the points b and c to the point d in FIG. 8, and back, and in this cycle (which is repeated at high speed) the lock up clutch 4 is engaged or is disengaged, by appropriate power supply to the solenoid S3, only in one or the other of the two blocks SET LOCK UP CLUTCH ON and SET LOCK UP CLUTCH OFF at the end of FIG. 8, according respectively as all of the flags F3, F4, F5, and F6 are zero, or not. As previously explained, the flag F3 is zero if and only if the braking system of the vehicle is not being applied, and the flag F4 is zero if and only if a longer time interval than T4 has elapsed since last the throttle of the engine of the vehicle was fully closed. Thus, the lock up clutch 4 will definitely not be engaged at any time if the braking system of the vehicle is being applied, or if the throttle of the vehicle has been closed at any time within the last time interval of length T4; and as explained earlier these two useful specializations of the present invention provide, respectively, protection against engine stalling during braking of the vehicle, and protection against transmission torque shock caused by sudden opening of the throttle after the throttle has been fully closed, i.e. snapping open of the throttle, because the lock up clutch 4 is definitely disengaged during both these cases, and accordingly the moderating effect of the torque converter 3 is available.

Now, consider the operation of the flag F1 and the timer TM1. Initially F1 is set to zero, in the START block. Therefore, whenever the lock up clutch 4 is found to be engaged, in the LOCK UP CLUTCH ON? decision block in FIG. 5, the result of the decision block F1=1? is NO, and the timer TM3 will be reset to zero. Further, while the speed stage of the gear transmission mechanism 7 is not to be changed, as determined in the SPEED CHANGE? decision block in FIG. 5, the value of the flag F1 is undisturbed and remains zero. Further, if the lock up clutch 4 comes to be disengaged, then the timer TM3 is allowed to start measuring time, and the time value stored in this timer TM3 will in fact represent the length of time since the lock up clutch 4 was last in the engaged condition. Further, since neither an upshift nor a downshift is currently being commanded, the timer TM2 is allowed to run, as can be seen from the control flow at the lower part of FIG. 6. Now, suppose that for the first time, as control flows around the flowchart, the result of the SPEED CHANGE? decision block in FIG. 5 is YES, indicating that a change of speed stage of the gear transmission mechanism 7 is to be made. Then, since F1 currently is zero, the timer TM1 is reset to zero and the flag F1 is set to 1. Thus, in future repetitions of the cycle of the flowchart, as long as the flag F1 remains equal to 1 the timer TM1 will be allowed to continue accumulating its count, i.e. to measure time. Further, on this particular cycle through the flowchart, since obviously the change of speed stage of the gear transmission mechanism 7 required must either be an upshift or a downshift, the result of one or the other of the decision blocks UPSHIFT? or DOWNSHIFT? in FIG. 6 must be YES, and thus definitely after other operations control will pass through the TM2=0 block and the timer TM2 will be reset to zero, i.e. when either the upshifting signal or the downshifting signal has been dispatched to switch over the energization of the solenoid or solenoids S1 and/or S2, the timer TM2 starts to count time, and then the timer TM2 is allowed to continue counting. Therefore, for the moment, since the timer TM2 will be nearly at zero by the time the decision block TM2 greater than T3? in FIG. 8 is reached, definitely neither the flag F1 will be set to zero, nor will the flags F2 or F5 be set to zero. Accordingly, the value of the flag F1 will not be disturbed, and will remain 1, until as suggested above the counted value of the time in TM2 becomes greater than T3, i.e. until a time instant later than the time instant of beginning of the change of speed stage of the transmission by the time interval T3. Therefore, during this time period, the flag F1 will remain 1, and the timers TM1 and TM3 will continue to count time. When once the speed stage signal for upshifting or downshifting has been dispatched, so that a necessary switching over of the energization of the solenoid or solenoids S1 and/or S2 is triggered, thereafter control passes to the NO side in both of the decision blocks UPSHIFT? and DOWNSHIFT?, so that the block TM2=0 is bypassed.

When the time count in the timer TM2 has become greater than T3, i.e. the speed stage change is certainly complete, the control passes on to set the flag F5 to zero while resetting the flags F1 and F2 to zero, and finally to the decision block F3 ... F6 ALL ZERO?, to decide on whether the lock up clutch 4 should be engaged or not.

In the case of a downshift, in the flowchart of FIG. 6, after the values of T1, T2, and T3 have been set as explained above, the counted time value in TM3 is tested against T1, and if the time in TM3 is greater than T1 then a speed stage change signal is output, while in the time in which TM3 is less than T1 then no speed change signal is output. This will be in order, whether in fact TM3 is counting time from the time instant when the block up clutch 4 was last engaged or from the time instant when a decision was made for change of speed stage of the gear transmission mechanism 7; in the first case, the lock up clutch 4 is no longer engaged, so it is quite in order to shift the gear transmission mechanism 7 down immediately; and in the other case, a time interval longer than T1 has elapsed since the time of the speed change decision, and so (see FIG. 9b) it is time to output the speed change signal, and therefore control is transferred to the OUTPUT SPEED CHANGE SIGNAL block, in which the command signal to change the speed stage of the gear transmission mechanism 7 down is outputted.

In the case of an upshift, in the flowchart of FIG. 6, the situation is somewhat more complicated. Initially the flag F2 is set to 0, and, like the flags F1 and F5, the flag F2 is reset to zero in the flowchart of FIG. 8 when the counted time value in the timer TM2 becomes greater than T3, in other words when the speed shifting has been completed. Now, when for the first time, as control flows around the flowchart, the result of the SPEED CHANGE? decision block in FIG. 5 is YES, indicating that a change of speed stage of the gear transmission mechanism 7 is to be made, and then at the head of FIG. 6 it is decided that an upshift is required, and then the setting of T0, T1, T2, and T3 is made in the SET T0, T1, T2, T3 block, then a check is made as to whether the counted time value in the timer TM3 is greater than T0 or not, in the TM3 greater than T0? decision block, and if it is not then the flag F2 is set to 1 and control passes on to the TM1 greater than T1? decision block, whereas if the counted time value in the timer TM3 is found to be greater than T0 in the TM3 greater than T0? decision block then if the flag F2 is still zero then T1 and T2 are set to zero, and again control passes on to the TM1 greater than T1? decision block. The meaning of this is that if on the first pass through this branch of the flowchart the counted time value in the timer TM3 is greater than a fairly small time value T0, then the timer TM3 did not start to count time from the time instant when a decision was made for change of speed stage of the gear transmission mechanism 7, since this is the first pass of control through the flowchart after the decision has been made to change the speed stage, and therefore the flag F1 has been reset to 0 and nevertheless the control did not pass through the TM3=0 block, but rather the timer TM3 must have started to count time from the time instant when when the lock up clutch 4 was last engaged; in other words, the lock up clutch is definitely disengaged now, and hence it is quite all right to commence shifting of speed stage immediately. In other words, this part of the flowchart corresponds to the fact that in the table of FIG. 10 the values of T1 and T2 corresponding to upshifting with the lock up clutch disengaged before upshifting are all zero, as remarked on before. Incidentally, the branches of this flowchart involving the flag F2 are in order to protect the values of T1 and T2 from being made zero, if initially they were non zero and later the lock up clutch 4 is disengaged on a subsequent pass through the flowchart, as will be clear to one skilled in the art upon inspection of the control flow.

Next, in the TM1 greater than T1? decision block, the current counted time value in the timer TM1 is tested to see whether it is greater than T1 or not, and if it is then the time has come to perform the upshift, since a time interval longer than T1 has elapsed since the time of the speed change decision, (see FIG. 9a), and therefore control is transferred to the OUTPUT SPEED CHANGE SIGNAL block, in which the command signal to change the speed stage of the gear transmission mechanism 7 up is outputted.

The flowchart of FIG. 7, and the meanings of the flags F3 and F4, have already been explained. When the flow of control enters into the flowchart of FIG. 8 at the point c, first in the TM1 greater than T2? decision block a test is made as to whether the time elapsed since the time point at which the decision was made to change the speed stage of the gear transmission mechanism 7, as measured by the timer TM1, is greater than the interval T2 or not; and, if it is not, then the flag F5 is set to zero, in the F5=0 block, and control passes next to enter the TM2 greater than T3? decision block. Now, this time interval T2 is zero in the case of a downshift, and in the case of an upshift is the proper time that should elapse from the time point of first deciding to change the transmission speed stage to the time point of outputting a signal to disengage the lock up clutch 4 (if in fact the lock up clutch 4 is engaged, of course). Therefore, if it is not yet time to disengage the lock up clutch 4, then the flag F5 is set to zero. On the other hand, the flag F6 is set to zero when the transmission is operating in the condition with the lock up clutch 4 being engaged. Therefore, in this case, as long as the time measured by the timer TM1 does not exceed T2, the lock up clutch is kept engaged. When the time measured by the timer TM1 has exceeds T2, the following events occur: first the flag F5 is set to 1, in the F5=1 block, and then, according as the lock up clutch 4 should be (eventually) engaged or disengaged in the current speed stage of the gear transmission mechanism 7 (which is the new speed stage if the command for change of speed stage has been outputted), the flag F6 is set to 0 or 1, respectively. In any case, control passes next to enter the TM2 greater than T3? decision block, in which it is decided whether or not the current time value measured on the timer TM2, in other words the time since a speed stage change signal was outputted, is greater than the time interval T3 or not; if it is, then the change of speed stages has been accomplished, and it is all right to reengage the lock up clutch. Accordingly, the flags F1 and F2 are reset to zero as has been explained already, and the flag F5 is set back to zero to allow the lock up clutch 4 to be engaged.

Finally, in the last part of the flowchart of FIG. 8, the lock up clutch 4 is either engaged or disengaged, by supply to the solenoid S3 of either an engage or a disengage signal, according as to whether all four of the flags F3 through F6 are zero, or not. Thus, the lock up clutch 4 is engaged, unless (1) the flag F3 is not zero, which corresponds to the case that the braking system of the vehicle is being applied; (2) the flag F4 is not zero, which corresponds to the case that the throttle of the vehicle has been fully closed within the recent past, i.e. within a time interval T4; (3) the flag F5 is not zero, which corresponds to the case that the time counted by the timer TM1 is greater than T2 and also the time counted by the timer TM2 is less than T3, i.e. the time, with reference to FIG. 9a or FIG. 9b, is between the time point for disengagement of the lock up clutch 4 and the subsequent time point for engagement of the lock up clutch 4, i.e. the lock up clutch 4 should be disengaged at this time for purposes of speed stage changing; or (4) the flag F6 is not zero, which corresponds to the case that the lock up clutch 4 should be disengaged in the current speed stage of the gear transmission mechanism 7. Otherwise, the lock up clutch 4 is disengaged. It will be clear upon consideration of this flowchart as a whole by a person skilled in the computer control art that the results thereof are to implement the control process described, which is the preferred embodiment of the transmission control method according to the present invention. Accordingly, the shown control computer 33 and transmission hydraulic fluid pressure control system 32 are comprised in and constitute the important portions of the preferred embodiment of the transmission control device according to the present invention.

Each of FIGS. 11, 12, and 13 is a set of a first, a second, and a third synchronized explanatory graph, in all of which time is the abscissa, and in the first of which engine rotational speed is the ordinate, in the second of which transmission power output shaft torque is the ordinate, and in the third of which hydraulic fluid pressure is the ordinate. These figures all relate to a transmission upshift from second speed stage to third speed stage in drive or "D" range in which the lock up clutch 4 is engaged before the upshift and is to be engaged again after the upshift. The figures show, respectively, for the case when the lock up clutch 4 is not disengaged during the upshift at any time (which is most undesirable), for the case when the lock up clutch 4 is disengaged during the upshift with the time point of commencement of disengagement of the lock up clutch 4 substantially simultaneous with the time point of commencement of the upshift (which is better but still not good), and for the case when the lock up clutch 4 is disengaged during the upshift with the time point of commencement of disengagement of the lock up clutch 4 delayed by a certain time interval T2-T1 from the time point of commencement of the upshift (according to the shown first embodiment of the transmission control method according to the present invention), the variation with time of engine rotational speed, transmission power output shaft torque, hydraulic fluid pressure which is being supplied to the clutch $C_2$ or clutch 18 of FIG. 1 to engage it from the disengaged condition so as to accomplish the upshift, and hydraulic fluid pressure which is being supplied to the lock up clutch 4 to disengage it (when this is the case).

From FIG. 11 it can be seen that in the case that the lock up clutch 4 is not disengaged during the upshift at any time there is no problem with regard to engine revolution speed, which drops quickly as the upshift occurs, but that also the power output shaft torque undergoes violent and repeated fluctuations. This corresponds, in the actual driving of the vehicle incorporating the transmission, to a violent shift shock, since the transmission has been changed from second speed stage to third speed stage without the benefit of the cushioning effect of the torque converter 3, which was locked up throughout the upshift by the lock up clutch 4, and is quite unacceptable in practice for reasons previously given. From FIG. 12 it can be seen that in the case that the lock up clutch 4 is disengaged during the upshift with the time point of commencement of disengagement of the lock up clutch 4 substantially simultaneous with the time point of commencement of the upshift there is not such a severe problem with regard to fluctuation of the torque in the power output shaft, although substantial variations of this output torque still occur, but that on the other hand in this case a problem arises with regard to engine revolution speed, which rises suddenly as the upshift starts and as the lock up clutch 4 is commenced to be disengaged as may be seen from the line representing the lock up clutch 4 release hydraulic fluid pressure. This corresponds, in the actual driving of the vehicle incorporating the transmission, to sudden racing or overrevving of the engine, and has occurred because the transmission has been changed from second speed stage to third speed stage with the lock up clutch 4 being released too early, and is also quite unacceptable in practice for reasons also previously given. On the other hand, from FIG. 13 it can be seen that in the case that the lock up clutch 4 is disengaged during the upshift with the time point of commencement of disengagement of the lock up clutch 4 delayed by a certain time interval T2-T1 from the time point of commencement of the upshift according to the shown preferred embodiment of the transmission control method according to the present invention, as performed by the shown first embodiment transmission control device according to the present invention, the variations in the torque in the power output shaft are further reduced, and further no particular problem arises with regard to engine revolution speed, which does not particularly rise at all as the upshift starts and as the lock up clutch 4 is commenced to be disengaged as may be seen from the line representing the lock up clutch 4 release hydraulic fluid pressure. This corresponds, in the actual driving of the vehicle incorporating the transmission, to a smooth upshift without particular shift shock or engine racing, that has occurred because the transmission has been changed from second speed stage to third speed stage with the lock up clutch 4 being released with the right timing, according to the shown preferred embodiment of the transmission control method according to the present invention, performed by the shown preferred embodiment of the transmission control device according to the present invention.

The graphs shown in FIGS. 11, 12, and 13 were produced by the present inventor in collaboration with others by a process of experiment. Although they relate only to the transmission upshift from second speed stage to third speed stage in drive or "D" range in which the lock up clutch 4 is engaged before the upshift and is to be engaged again after the upshift, in fact according to the shown preferred embodiment of the present invention a similar improvement may be attained in the other upshift cases in which the lock up clutch 4 may be engaged just before the upshift, such as the case of upshift from the third speed stage to the overdrive speed stage. In each case, the occurrence of engine racing is prevented by the practice of the shown preferred embodiment of the present invention, i.e. by delaying the instant of commencement of disengagement of the lock up clutch 4 by a certain time period after the instant of starting to upshift the gear transmission mechanism 7. Further, although no graphs such as FIGS. 11, 12, and 13 are particularly given in this specification with relation to downshifting of the gear transmission mechanism 7, the transmission control method according to the shown preferred embodiment of the transmission control method according to the present invention, as practiced by the shown preferred embodiment of the transmission control device according to the present invention, is as explained above also applicable to the downshifting cases, in which cases the occurrence of transmission shift shock is prevented by the practice of the preferred embodiment of the present invention, i.e. by advancing the instant of commencement of disengagement of the lock up clutch 4 by a certain time period before the instant of starting to downshift the gear transmission mechanism 7.

Finally, it is a very important feature of the shown preferred embodiment of the transmission control method according to the present invention, as practiced by the shown preferred embodiment of the transmission control device according to the present invention, that the amounts of the time displacements between the time instant of commencement of the time period of disengagement of said lock up clutch 4 and the time instant of commencement of the time period occupied by the process of change of speed stage of the gear transmission mechanism 7 from the speed stage before the change to the speed stage after the change should vary between the several different combinations of speed stages of the gear transmission mechanism before and after the speed stage change. According to such a method, the variation of these time periods may be so arranged as to give the most appropriate possible shifting characteristics to the transmission in all circumstances.

Although the present invention has been shown and described with reference to a preferred embodiment thereof, and in terms of the illustrative drawings, it should not be considered as limited thereby. Various possible modifications, omissions, and alterations could be conceived of by one skilled in the art to the form and the content of any particular embodiment, without departing from the scope of the present invention. Therefore it is desired that the scope of the present invention, and of the protection sought to be granted by Letters Patent, should be defined not by any of the perhaps purely fortuitous details of the shown embodiment, or of the drawings, but solely by the scope of the appended claims, which follow.

What is claimed is:

1. In a vehicle transmission comprising a gear transmission mechanism which comprises a plurality of first hydraulic fluid pressure activated friction engaging mechanisms and which includes a plurality of shift stages including a plurality of forward speed stages according to selective supply of hydraulic fluid pressure to said first hydraulic fluid pressure activated friction engaging mechanisms, said transmission also comprising a torque converter and a lock-up clutch which comprises at least one second hydraulic fluid pressure activated friction engaging mechanism, said torque converter functioning when said lock-up clutch is disengaged but being locked-up when said lock-up clutch is engaged so as to provide direct transmission of rotational power through said torque converter according to selective supply of hydraulic fluid pressure to said second hydraulic fluid pressure activated friction engaging mechanism, a transmission control method, comprising the steps of:

(a) determining which of said plurality of shift stages should be currently provided by said gear transmission mechanism according to current operational conditions of said vehicle;

(b) selectively controlling supply of activating hydraulic fluid pressure to at least two of said first hydraulic fluid pressure activated friction engaging mechanisms to cause said gear transmission mechanism to selectively engage one of said plurality of shift stages in accordance with the determination of step (a), and altering said selectively controlled supply of activating hydraulic fluid pressure to at least some of said first hydraulic fluid pressure activated friction engaging mechanisms to cause said gear transmission mechanism to shift between selected ones of said plurality of shift stages in accordance with the determination of step (a);

(c) selectively controlling supply of hydraulic fluid pressure to said second hydraulic fluid pressure activated friction engaging mechanism to cause said lock-up clutch to be engaged or disengaged in accordance with operational conditions of said vehicle and in accordance with said shifting between said selected ones of said shift stages;

(d) time shifting in a first programmed manner between a time point of said determination with regard to said shift stages and a time point of commencement of said alteration of said selective control of supply of activating hydraulic fluid pressure to at least some of said first hydraulic fluid pressure activated friction engaging mechanisms to cause said gear transmission mechanism to shift between said selected ones of said plurality of shift stages;

(e) time shifting in a second programmed manner between a time point of said determination with regard to said shift stages and a time point of commencement of said selective control of supply of activated hydraulic fluid pressure to said second hydraulic fluid pressure activated friction engaging mechanism to cause said lock-up clutch to be disengaged; and (f) time shifting in a third programmed manner between a time point of commencement of said alteration of said selective control of supply of activating hydraulic fluid pressure to at least some of said first hydraulic fluid pressure activated friction engaging mechanisms to cause said gear transmission mechanism to shift between said selected ones of said plurality of shift stages and a time point of commencement of said selective control of supply of activated hydraulic fluid pressure to said second hydraulic fluid pressure activated friction engaging mechanism to cause said lock-up clutch to be engaged.

2. A transmission control method according to claim 1, wherein said alteration of said selective control of supply of activating hydraulic fluid pressure to at least some of said first hydraulic fluid pressure activated friction engaging mechanisms to cause said transmission mechanism to shift between said selected ones of said plurality of shift stages is to cause said transmission mechanism to upshift between two of said plurality of forward speed stages, said lock-up clutch being in the engaged condition at the time point of said determination with regard to said shift stages, said second programmed time shifting being to delay the time point of commencement of said selective control of supply of activating hydraulic fluid pressure to said second hydraulic fluid pressure activated friction engaging mechanism to cause said lock-up clutch to be disengaged from the time point of said determination with regard to said shift stages by a time duration which is larger than a time duration of said first programmed time shifting by which the time point of commencement of said alteration of said selective control of supply of activating hydraulic fluid pressure to at least some of said first hydraulic fluid pressure activated friction engaging mechanisms to cause said gear transmission mechanism to shift between said two forward speed stages is delayed from the time point of said determination with regard to said shift stages.

3. A transmission control method according to claim 1, wherein said alteration of said selective control of supply of activating hydraulic fluid pressure to at least some of said first hydraulic fluid pressure activated friction engaging mechanisms to cause said transmission mechanism to shift between said selected ones of said plurality of shift stages is to cause said transmission mechanism to downshift between two of said plurality of forward speed stages, said lock-up clutch being in the engaged condition at the time point of said determination with regard to said shift stages, said first programmed time shifting being to delay the time point of commencement of said alteration of said selective control of supply of activating hydraulic fluid pressure to at least two of said first hydraulic fluid pressure activated friction engaging mechanisms to cause said gear transmission mechanism to shift between said two forward speed stages from the time point of said determination with regard to said shift stages by a time duration which is larger than a time duration of said second programmed time shifting by which said time point of commencement of said selective control of supply of activated hydraulic fluid pressure to said second hydraulic fluid pressure activated friction engaging mechanism to cause said lock-up clutch to be disengaged is delayed from the time point of said determination with regard to said shift stages.

4. A transmission control method according to claim 3, wherein the time duration of said second programmed time shifting by which the time point of commencement of said selective control of supply of activating hydraulic fluid pressure to said second hydraulic fluid pressure activated friction engaging mechanisms to cause said lock-up clutch to be disengaged is delayed from the time point of said determination with regard to said shift stages is zero.

5. A transmission control method according to claim 1, wherein said alteration of said selective control of supply of activating hydraulic fluid pressure to at least some of said first hydraulic fluid pressure activated friction engaging mechanisms to cause said gear transmission mechanism to shift between said selected ones of said plurality of shift stages is to cause said transmission mechanism to upshift between two of said plurality of forward speed stages, said lock-up clutch being in the disengaged condition at the time point of said determination with regard to said shift stages, said first programmed time shifting and said second programmed time shifting both being of zero time duration.

6. A transmission control method according to claim 1, wherein said alteration of said selective control of supply of activating hydraulic fluid pressure to at least some of said first hydraulic fluid pressure activated friction engaging mechanisms to cause said gear transmission mechanism to shift between said selected ones of said plurality of shift stages is to cause said transmission mechanism to downshift between two of said plurality of forward speed stages, said lock-up clutch being in the disengaged condition at the time point of said determination with regard to said shift stages, said first programmed time shifting and said second programmed time shifting both being of zero time duration.

7. A transmission control method according to claim 1, wherein said third programmed time shifting is further modified to delay the time point of commencement of said selective control of supply of activated hydraulic fluid pressure to said second hydraulic fluid pressure activated friction engaging mechanism to cause said lock-up clutch to be engaged as long as said vehicle is being braked.

8. A transmission control method according to claim 1, wherein said third programmed time shifting is further modified to delay the time point of commencement of said selective control of supply of activated hydraulic fluid pressure to said second hydraulic fluid pressure activated friction engaging mechanism so as to cause said lock-up clutch to be engaged as long as a predetermined time lapses from a time point of fully closing an intake throttle valve of said vehicle.

* * * * *